United States Patent [19]

Endo et al.

[11] Patent Number: 5,392,070

[45] Date of Patent: Feb. 21, 1995

[54] APPARATUS FOR CORRECTING FAULTY PIXEL SIGNALS BY REPLACING THE FAULTY PIXEL SIGNALS WITH NORMAL PIXEL SIGNALS

[75] Inventors: Yukio Endo, Yokohama; Yoshitaka Egawa, Kawasaki, both of Japan

[73] Assignee: Kabushiki Kaisha Toshiba, Kawasaki, Japan

[21] Appl. No.: 981,290

[22] Filed: Nov. 25, 1992

[30] Foreign Application Priority Data

Nov. 26, 1991 [JP] Japan .................................. 3-310785
Sep. 14, 1992 [JP] Japan .................................. 4-271205

[51] Int. Cl.$^6$ .............................................. H04N 5/335
[52] U.S. Cl. ..................................... 348/247; 348/241
[58] Field of Search ................... 358/213.15, 167, 177; 382/65, 67, 68; 348/246, 247, 241, 243, 245, 222; H04N 5/335

[56] References Cited

U.S. PATENT DOCUMENTS

| | | | |
|---|---|---|---|
| 4,167,754 | 9/1979 | Nagumo et al. | 358/213.17 |
| 4,413,284 | 11/1983 | Izumita et al. | 358/213.15 |
| 4,734,774 | 3/1988 | Skaggs et al. | 358/213.15 |
| 4,739,495 | 4/1988 | Levine | 358/213.15 |
| 4,827,342 | 5/1989 | Ohta et al. | 358/167 |
| 4,914,519 | 4/1990 | Hashimoto et al. | 358/213.15 |
| 4,920,428 | 4/1990 | Lin et al. | 358/213.15 |
| 5,191,424 | 3/1993 | Nohmi et al. | 358/213.15 |

FOREIGN PATENT DOCUMENTS 55-32270  8/1980  Japan .

*Primary Examiner*—Joseph Mancuso
*Assistant Examiner*—John B. Vigushin
*Attorney, Agent, or Firm*—Oblon, Spivak, McClelland, Maier & Neustadt

[57] ABSTRACT

An image signal processing apparatus has a fault correcting circuit for replacing a signal output by a fault pixel included in a solid-state image sensor with a signal output by a normal pixel arranged near the fault pixel to correct the fault pixel signal. The fault correcting circuit comprises a memory for storing a data code representing the position and type of the fault pixel, a decoder circuit for converting the data code read from the memory, into a pixel-fault correction pulse, a dividing-/delay circuit for dividing a pixel signal output from the image sensor into a plurality of pixel signals and delaying these pixel signals by different delay times, and a switch circuit for selecting pixel signals delayed by different delay times, in accordance with the pixel-fault correction pulse, thereby to replace the fault pixel signal with the normal pixel signal.

27 Claims, 25 Drawing Sheets

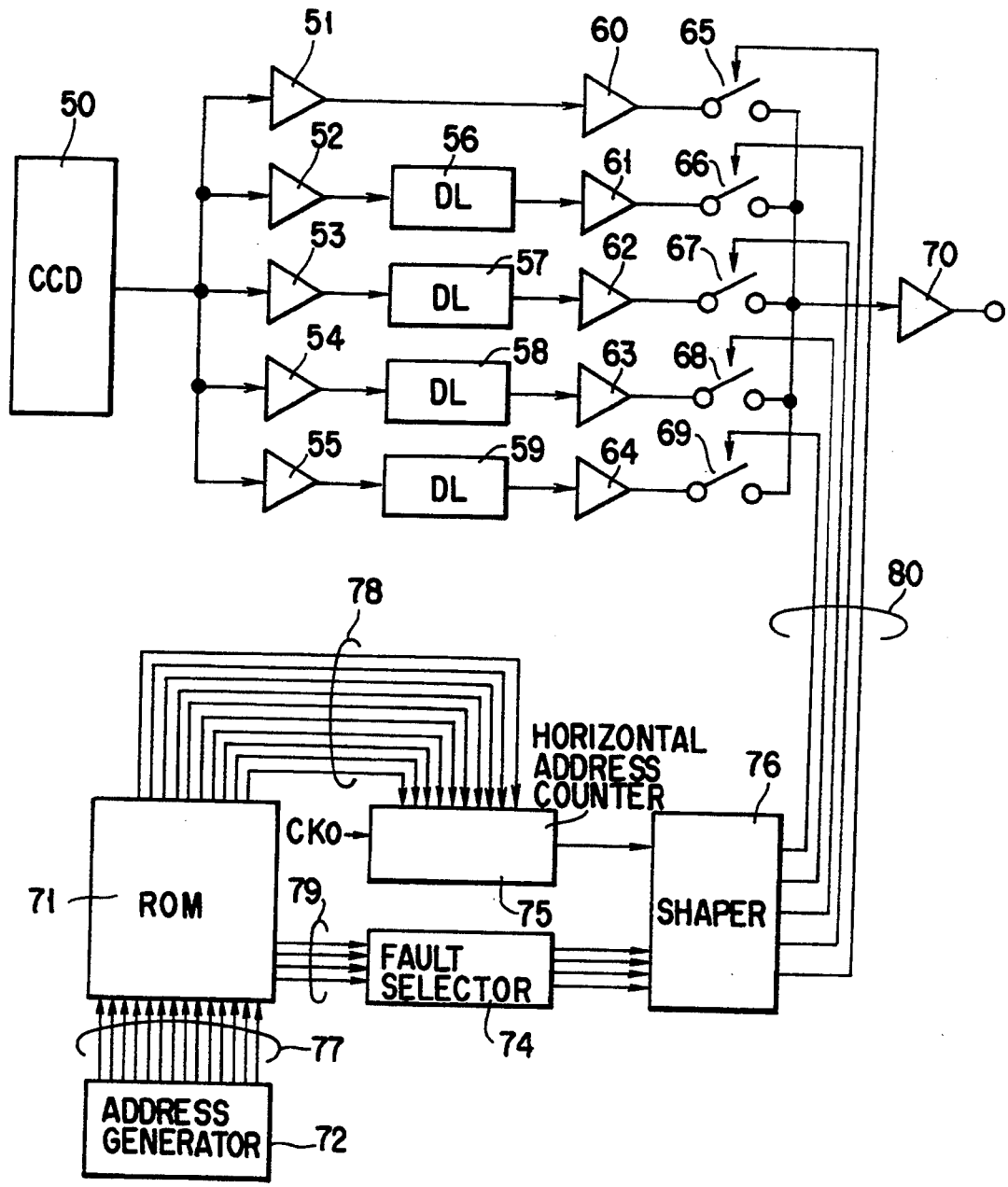
F I G. 5

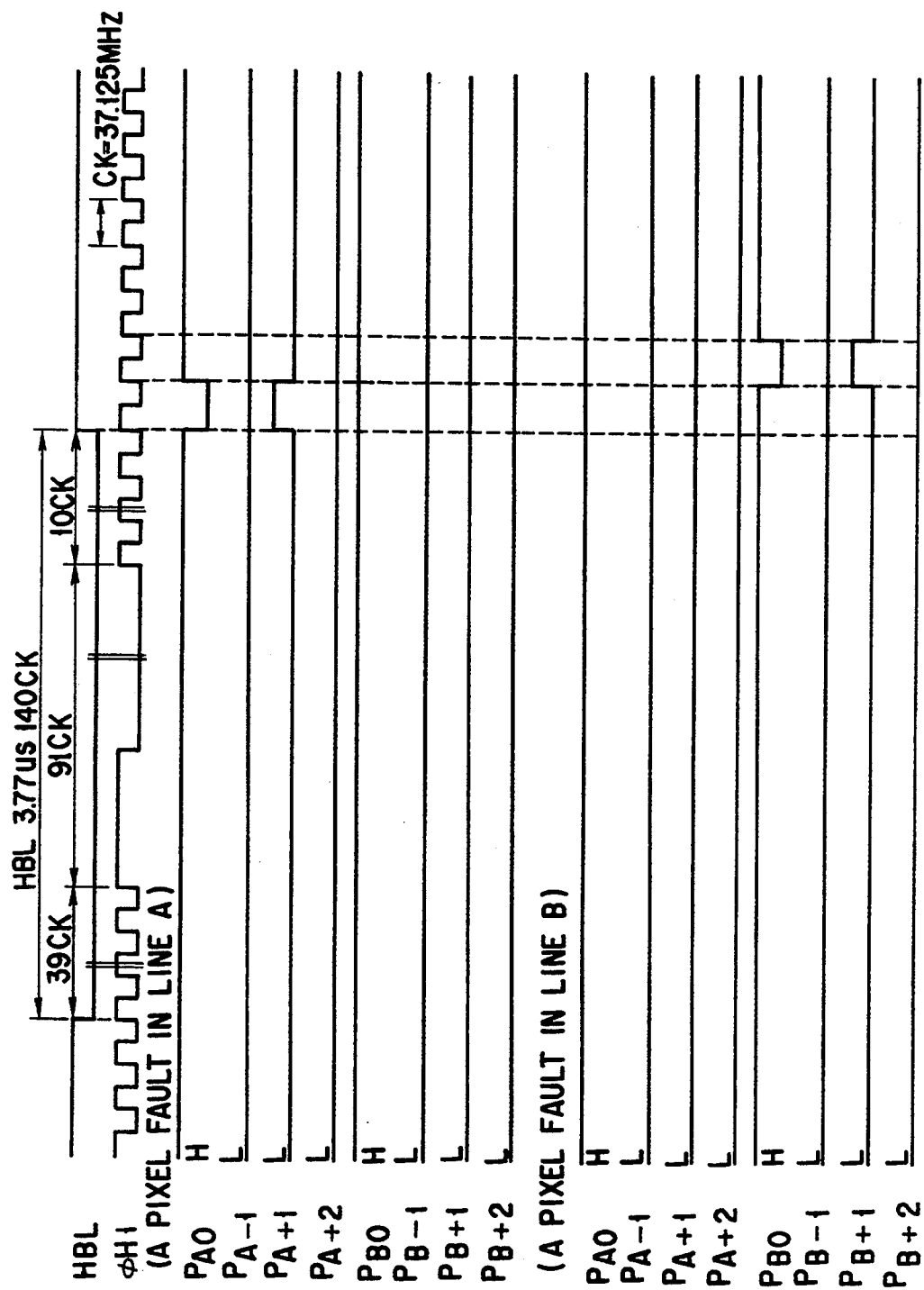
F I G. 14

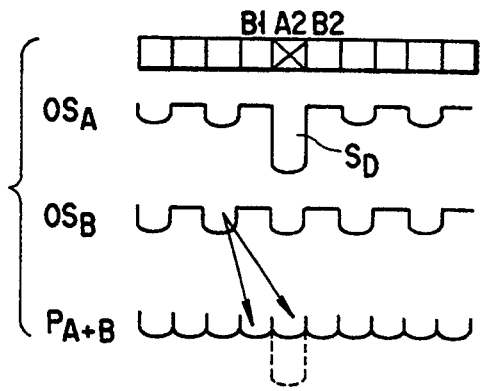
F I G. 17A
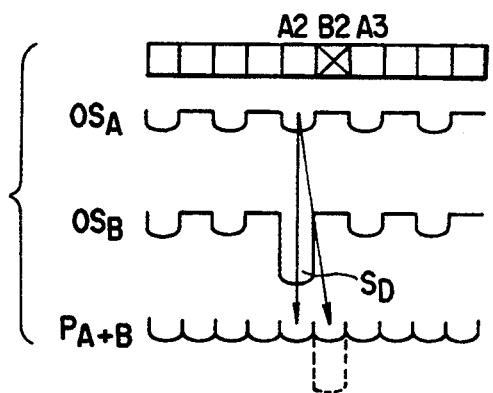
F I G. 17B
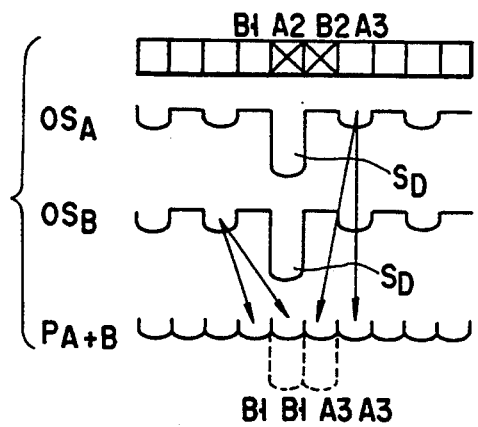
F I G. 17C
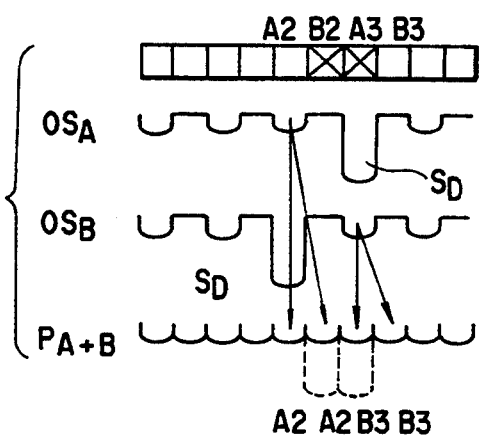
F I G. 17D
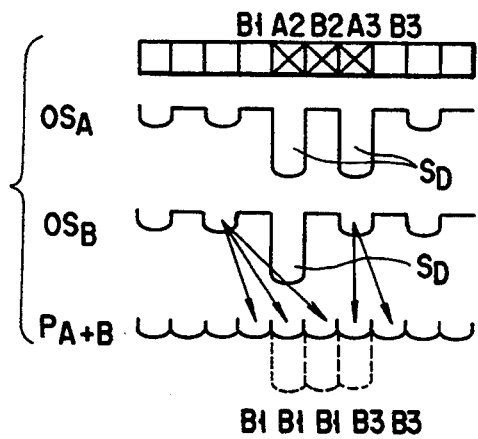
F I G. 17E
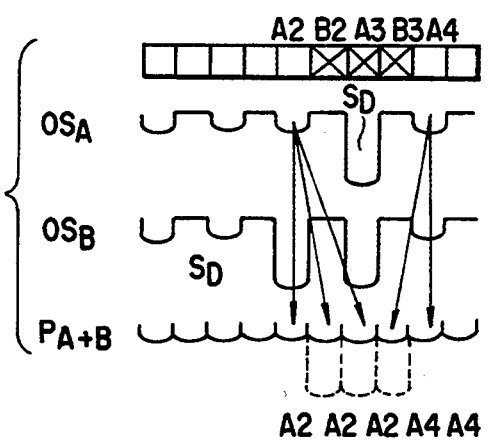
F I G. 17F

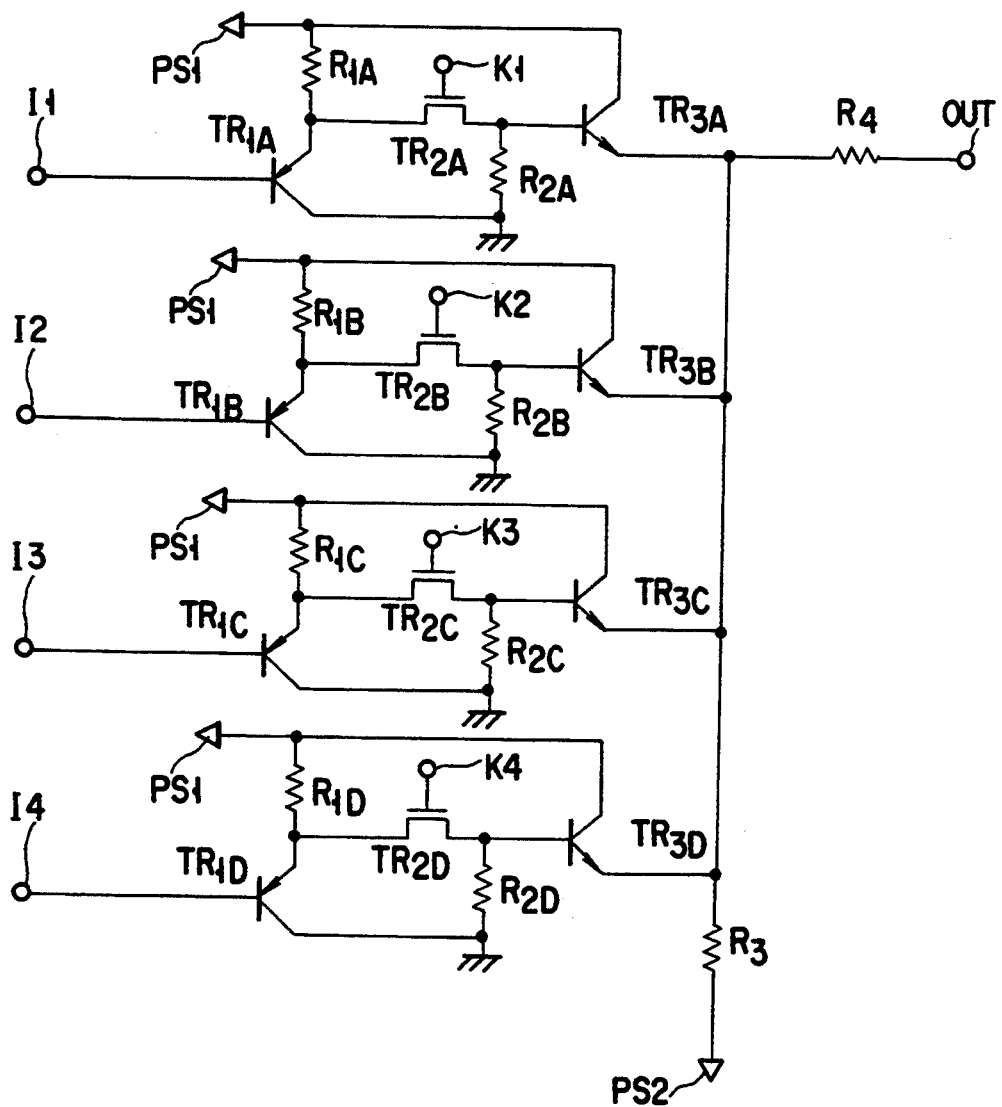
F I G. 22

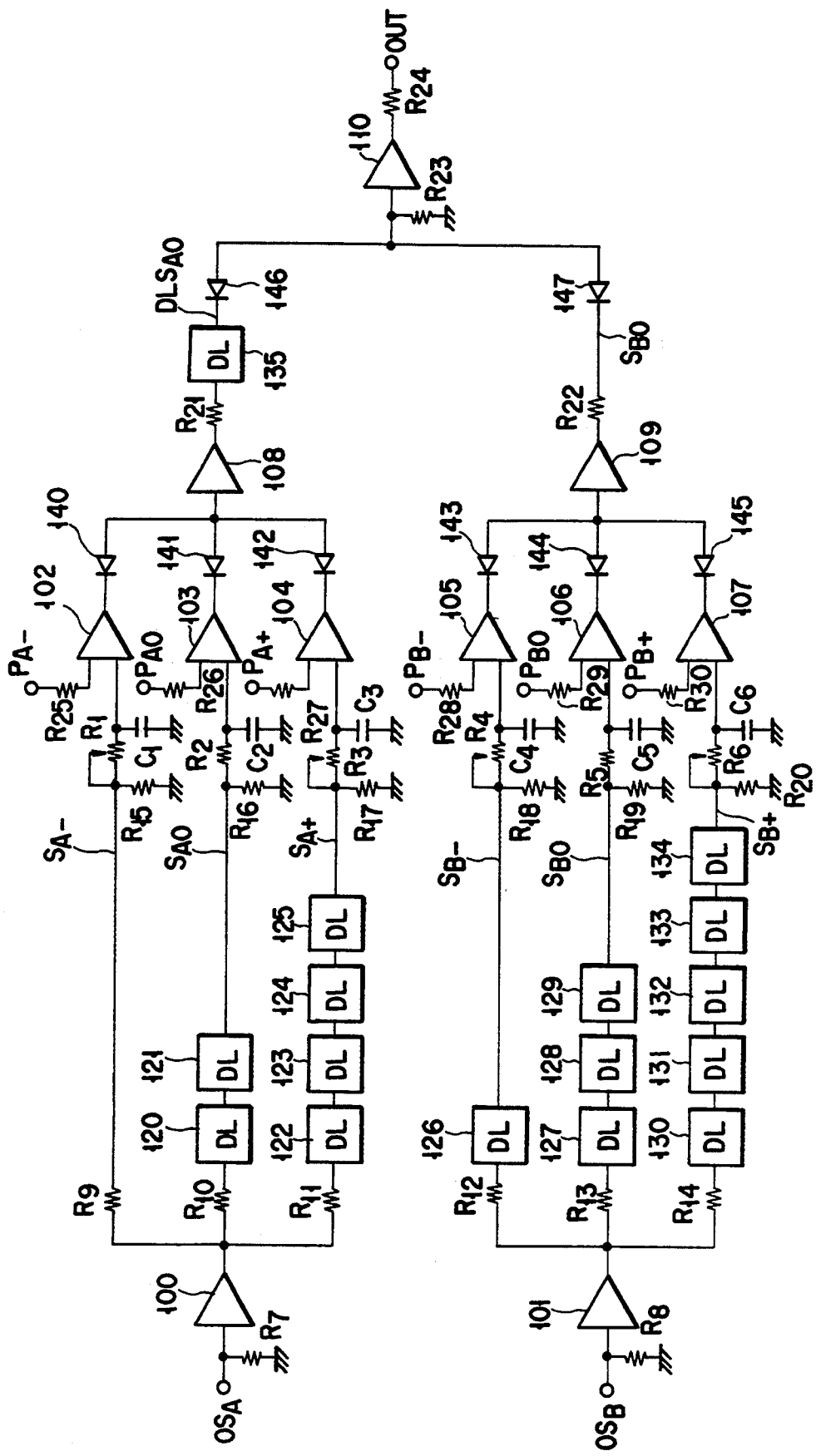
F I G. 26

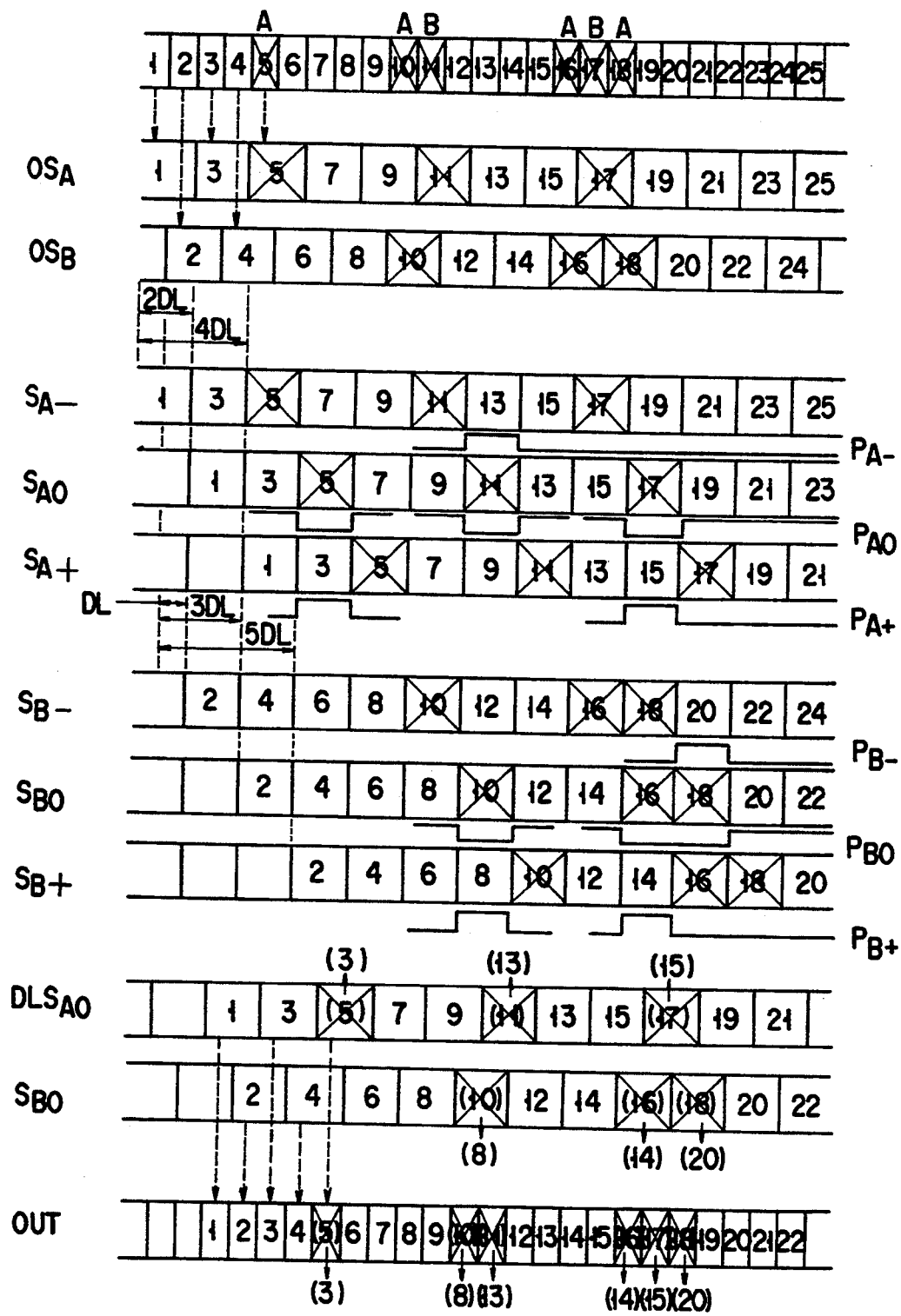
F I G. 27

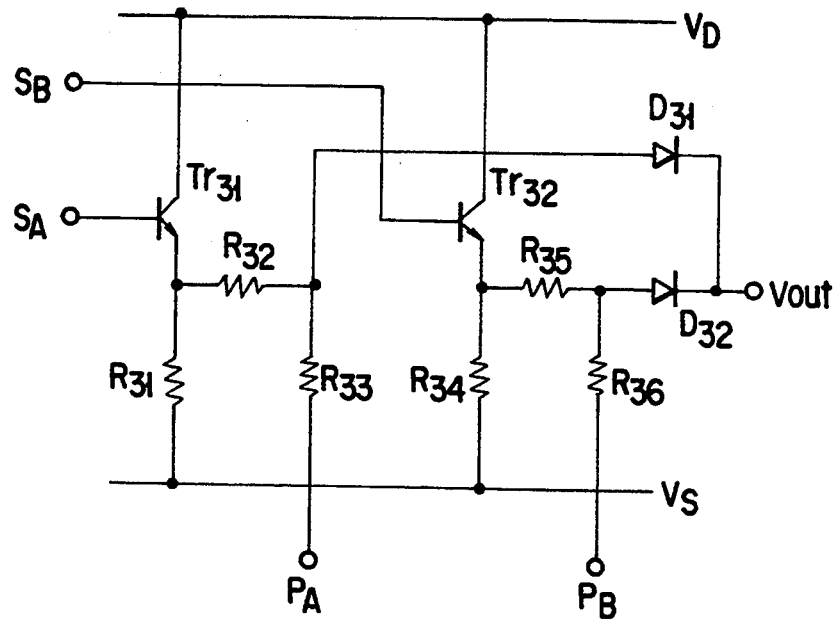
F I G. 28
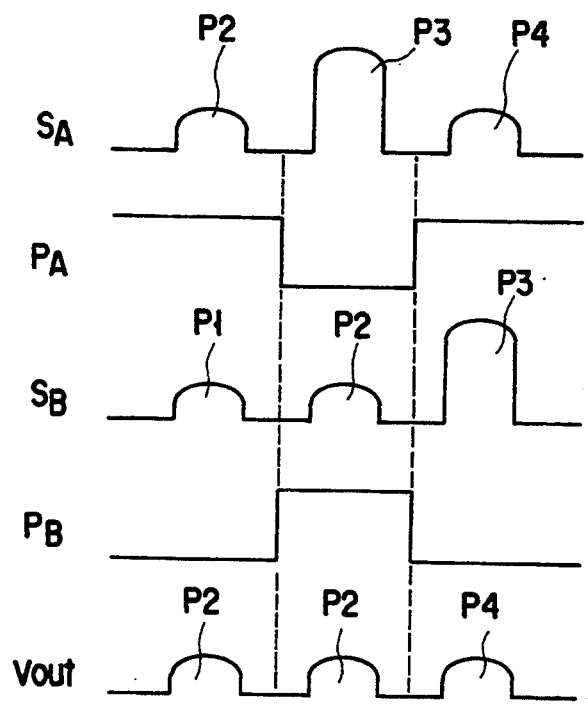
F I G. 29

APPARATUS FOR CORRECTING FAULTY PIXEL SIGNALS BY REPLACING THE FAULTY PIXEL SIGNALS WITH NORMAL PIXEL SIGNALS

BACKGROUND OF THE INVENTION

1. Field of the Invention

The present invention relates to an image signal processing apparatus, and more particularly to an image signal processing apparatus which can correct a signal containing noise resulting from fault pixels of a solid-state imaging device.

2. Description of the Related Art

A solid-state imaging device having a charge-coupled device (CCD) or the like is a small, light, reliable and low-maintenance device, and is incorporated in various types of cameras. Recently, a solid-state imaging device has been developed, which is designed for use in a high-vision camera, and its practical use is now greatly expected.

A solid-state imaging device for use in a high-vision camera should comprise many pixels, have high sensitivity, and operate at high speed. More specifically, it is demanded that the device have 2,000,000 pixels arranged in 1,000 rows and 2,000 columns and read 2,000,000 pixel signals at frequency of 74.25 MHz. Complex technology must be implemented to read so many pixel signals at such a high speed. It is difficult to form an uniform layer of semiconductor crystal in a specific area on the substrate of a solid-state imaging device. In most cases, the crystal layer has defects. Heat is generated at each defect during the use of the imaging device. Hence, any pixel having a crystal defect has a greater charge than a pixel having no crystal defects, so that the fault pixel forms a larger dot than a normal pixel.

In the case where 1,000,000 pixels are arranged in a ⅔-inch image format, the size of each pixel is about 5 $\mu m \times 5 \mu m$. If a dust particle sticks to such a tiny pixel during the manufacture of the solid-state imaging device, it will make the pixel a fault one, however small it is. The signal output from any fault pixel will make a noise, which will inevitably degrade the quality of the image reproduced from the pixel signals.

Methods are available for processing signals thereby to compensate for such pixel fault, as is disclosed in Published Unexamined Japanese Patent Application 55-32270 and Published Examined Japanese Patent Application 2-7227. The technique of correcting pixel fault, disclosed in these publications, is to use a signal processing apparatus having a sample-and-hold circuit. The sample-and-hold circuit holds a sampling pulse at any position where pixel fault has developed, thereby to replace the signal output by the fault pixel with the signal output by the immediately preceding pixel. This technique is disadvantageous in terms of speed, noise, and the like. Since the sample-and-hold operation is performed during the period of a pixel signal, the pulses used for this operation enter the pixel signal output by any normal pixel, whereas no pulses enter into the signal output by any fault pixel. The signal the fault pixel outputs, therefore, differs in level from the signals the normal pixels output. This makes it impossible to correct pixel fault reliably. Further, the sample-and-hold circuit needs to be operated at an extremely high speed since the pulses it uses have a width of 2 ns. If any pulse has jitter, a noise will affect the waveform of the output signal, in amplitude direction.

The conventional signal processing apparatus cannot process signals at a sufficiently high speed since the sample-and-hold operation is performed during the period of a pixel signal, inevitably generating a noise. The circuit is also disadvantageous in that noise is generated as data is read from a ROM storing the data representing the position where pixel fault has been corrected. The fault-correcting circuit incorporated in the conventional signal processing apparatus corrects one pixel fault at one position, not able to correct two or more pixel faults at one position.

SUMMARY OF THE INVENTION

The object of the invention is to provide an image signal processing apparatus which can correct an image signal containing a noise resulting from the signal output by a fault pixel or from the signals output by two or more fault pixels, if any, in a solid-state imaging device or the like, and which can therefore serve to reproduce a high-quality image.

According to an aspect of this invention, there is provided an image signal processing apparatus which can correct the signal output by a fault pixel included in a solid-state device, by using the signals output by the normal pixels near the fault pixel. To correct the signal output by the fault pixel, the apparatus has means for dividing each pixel signal supplied from the imaging device into a plurality of pixel signals and delaying at least some of the divided pixel signals at different delay amounts, and means for selectively combining the non-delayed pixel signal and the delayed pixel signals.

The digital image signal processing apparatus has a fault-correcting circuit designed to correct a fault pixel signal, if any, output from a solid-state imaging device which has pixels arranged in rows and columns. The fault-correcting circuit comprises a memory for storing the data representing the position and type of a fault pixel, if any, among the pixels of the imaging device, a decoder circuit for converting a data code read from the memory, into a pixel-fault correction pulse, and a circuit for replacing the signal output by the fault pixel with the signals output by the normal pixels arranged near the fault pixel, in response to the pixel-fault correction pulse.

According to a second aspect of the present invention, there is provided an image signal processing apparatus having a fault-correcting circuit which comprises: a memory for storing data representing the position and type of a fault pixel; a decoder circuit for converting a data code read from the memory, into a pixel-fault correction pulse; a dividing/delay circuit for dividing a pixel signal supplied from a solid-state imaging device, into a plurality of pixel signals delayed by different periods; and a switch circuit for selecting one of the pixel signals in response to the pixel-fault correction pulse and for replacing the pixel signal output by the fault pixel with the selected one of the pixel signals output by the normal pixels arranged near the fault pixel.

The image signal processing apparatus can reduce noise at high speed since the following measures are taken:

(1) The switch circuit replaces the pixel signal output by the fault pixel, with one of the pixel signals output by the normal pixels arranged in the same horizontal scanning line as the fault pixel.

(2) The dividing/delay circuit has a plurality of analog delay lines, and the switch circuit is turned on and off by the correction pulse during the ineffective period of any signal output by the solid-state imaging device, thereby switching the signals delayed by the analog delay lines.

(3) The solid-state imaging device has two output lines, and the switch circuits corresponding to the two output lines are switched by the correction pulse in in-phase fashion.

(4) The data representing the position and type of the fault pixel is read from the memory in the form of code data, which drives an address counter during an effective horizontal period. The address pulse output by the address counter and the pulse for selecting the type of the fault pixel are combined into a correction pulse.

(5) The decoder circuit comprises a horizontal address counter for output data representing the position of only one of fault pixels arranged in the same horizontal scanning line, a pixel-fault selecting circuit for outputting data items representing the types of two or more fault pixels during the effective horizontal period, and a pulse shaper for combining the pulse output by the horizontal address counter and the pulse output by the pixel-fault selecting circuit, thereby forming a pixel-fault correction pulse.

(6) The horizontal address counter is a gray counter. The code read from the memory is supplied to the set input of the gray counter, and the carry pulse output by the gray counter is used to generate the data showing the position of a predetermined one of the pixels arranged in the same horizontal scanning line.

(7) The dividing/delay circuit has a function which can control the DC offsets of the signals obtained by dividing a pixel signal output by the imaging device, independently of each other.

(8) The switch circuit comprises a plurality of switches and a plurality of transistors. The switches are connected to receive the signals output by the dividing/delay circuit. The transistors are connected to the outputs of the switches, respectively, and have their emitters connected to each other. Each transistor is so biased that it is turned on and off as the associated switch is turned on and off.

(9) The pixel signal of the image signal processing apparatus is a digital signal. The digital signal is processed by the dividing/delay circuit and the switch circuit. More specifically, the dividing/delay circuit divides the digital signal into a plurality of pixel signals, and the switch circuit switches the signals output by the dividing/delay circuit.

(10) The dividing/delay circuit and the switch circuit are constituted by a charge-coupled device (CCD).

According to a third aspect of this invention, there is provided a digital image signal processing apparatus having a fault-correcting circuit designed to correct a signal output by a fault pixel, if any among the pixels of a solid-state imaging device, which are arranged in rows and columns, by using the signals output by the normal pixels arranged near the fault pixel. The fault-correcting circuit comprises a memory for storing the data representing the position and type of a fault pixel, if any, among the pixels of the imaging device; a decoder circuit for converting a data code read from the memory, into a pixel-fault correction pulse; a dividing/delay circuit for dividing a pixel signal supplied from a solid-state imaging device, into a plurality of pixel signals delayed by different periods; first signal-extracting means for level-shifting the fault pixel signal output by the fault pixel or the signal output by any other pixel, in accordance with the pixel-fault correction pulse, thereby to extract the signal output by the pixel other than the fault pixel; second signal-extracting means for level-shifting the signal to replace the fault pixel signal, or any other signal, thereby to extract a normal pixel signal for use in correcting the fault pixel signal; and signal synthesizing means for combining the signal extracted by the first signal-extracting means and the normal pixels signal extracted by the second signal-extracting means.

According to a fourth aspect of this invention, there is provided a digital image signal processing apparatus having a fault-correcting circuit which comprises: a memory for storing data representing the position of a fault pixel; a decoder circuit for converting the data stored in the memory, into a pulse designating the position of the fault pixel; a dividing/delay circuit for dividing a pixel signal supplied from a solid-state imaging device, into a plurality of pixel signals delayed by different periods; a first level-shifting circuit for shifting the level of a fault pixel signal in accordance with the pulse designating the position of the fault pixel; a second level-shifting circuit for shifting the levels of pixel signals other than the pixel signal which is to be corrected by a normal pixel signal; and a signal-synthesizing circuit for combining the signals output by the first and second level-shifting circuits, during a period in which the level-shifting operation is not performed.

The fault-correcting circuit is one of the three types described below:

(1) The first type, in which the first level-shifting circuit comprises two transistors connected in series. The same current flows through the collectors of the transistors. A pixel signal and the output pulse of the decoder circuit is supplied to the bases of the transistors, respectively. The collector current of each transistor is controlled to shift the level of the level of a fault pixel signal.

(2) The second type, in which the first level-shifting circuit comprises one transistor. Two resistors are connected to the emitter and collector of the transistor, respectively, and a pixel signal is supplied to the base of the transistor, thereby constituting an inverting amplifier. A switch circuit is connected between the resistors. The switch circuit is controlled by the output pulse of the decoder circuit. As a result, the resistors are short-circuited, controlling the collector voltage of the transistor to shift the level of a fault pixel signal.

(3) The third type, in which the first level-shifting circuit combines the pixel signal with the output pulse of the decoder circuit, thereby to shift the level of a fault pixel signal.

Any digital image signal processing apparatus of the invention, described above, can reliably correct the signals output from fault pixels, if any, in the solid-state imaging device for use in a high-vision camera. More precisely, the apparatus can correct the signal output by a fault pixel or the signals output by two or more fault pixels, if any, in a solid-state imaging device or the like. Even if two or more pixel faults have developed at one position, these faults are corrected by interpolation using the signals output by the normal pixels arranged near the position in the same horizontal scanning line, thus reducing the correction error. In addition, since one of the signals obtained by dividing each pixel signal and delayed for different periods of time is selected in accordance with the type of the fault pixel, it is suffices to impart a low frequency to the pixel-fault correction pulse, and the signal processing apparatus of the invention can process digital image signals at a higher speed than the conventional apparatus which performs sample-and-hold operation.

Further, one of the signals obtained by dividing each pixel signal is selected by the switch circuit during the ineffective period of any signal output by the solid-state imaging device. Therefore, no pulses enter into the signal thus selected, whereby an increase in noise is prevented. Still further, no noise is generated from the correction pulse since the pulse has been produced by one address counter and the code data from the memory is transferred during the horizontal blanking period.

Moreover, the invention does not use a switch circuit but a level-shifting circuit wherein a fault pixel signal and pixel signals other than the fault pixel signal are level-shifted and are combined together, in order to correct a pixel-fault. Hence, the correction pulse needs to be set at so low a voltage as b 0.5 Vp-p, which is only one tenth of the voltage (i.e., about 5 Vp-p) which the pulse should have if the switch circuit were used to switch signals to correct pixel fault. In this case, noise can be more reliably prevented from being made.

As has been described, the digital image signal processing apparatus of the invention differs from the conventional apparatus in which a normal pixel signal is directly sampled and held. The apparatus of the invention comprises means for dividing a pixel signal output by any pixel of a solid-state imaging device into a plurality of pixel signals and delaying at least some of the pixel signals, and means for selecting one of the delayed pixel signals. In the apparatus of the invention, the pixel signal output by a fault pixel, if any, is corrected by using the pixel signals output by the normal pixels located near the fault pixel, and two or more pixel faults, if any, at one position can be corrected at high speed, without increasing noise.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a circuit diagram showing an image signal processing apparatus according to a second embodiment of the present invention;

FIG. 14 is also a timing chart explaining how the circuit of FIG. 12 corrects a pixel fault in line A and a pixel fault in line B;

FIGS. 17A to 17F are diagram explaining how to correct the fault occurring at one pixel, the faults occurring at two pixels of the same row, and the faults occurring at three pixels;

FIG. 22 is a diagram showing the pixel-fault correcting circuit incorporated in an image signal processing apparatus according to a fifth embodiment of the invention;

FIG. 26 is a diagram showing the pixel-fault correcting circuit used in an image signal processing apparatus according to an eighth embodiment of the present invention;

FIG. 27 is a diagram explaining the operation of the circuit shown in FIG. 26;

FIG. 28 is a diagram showing a pixel-fault correcting circuit, in which an electrical resistance is controlled, achieving level shifting, thereby to correct pixel fault;

FIG. 29 is a diagram showing the waveforms of signals, explaining how the circuit of FIG. 28 performs its function;

DETAILED DESCRIPTION OF THE PREFERRED EMBODIMENTS

Figure 1:
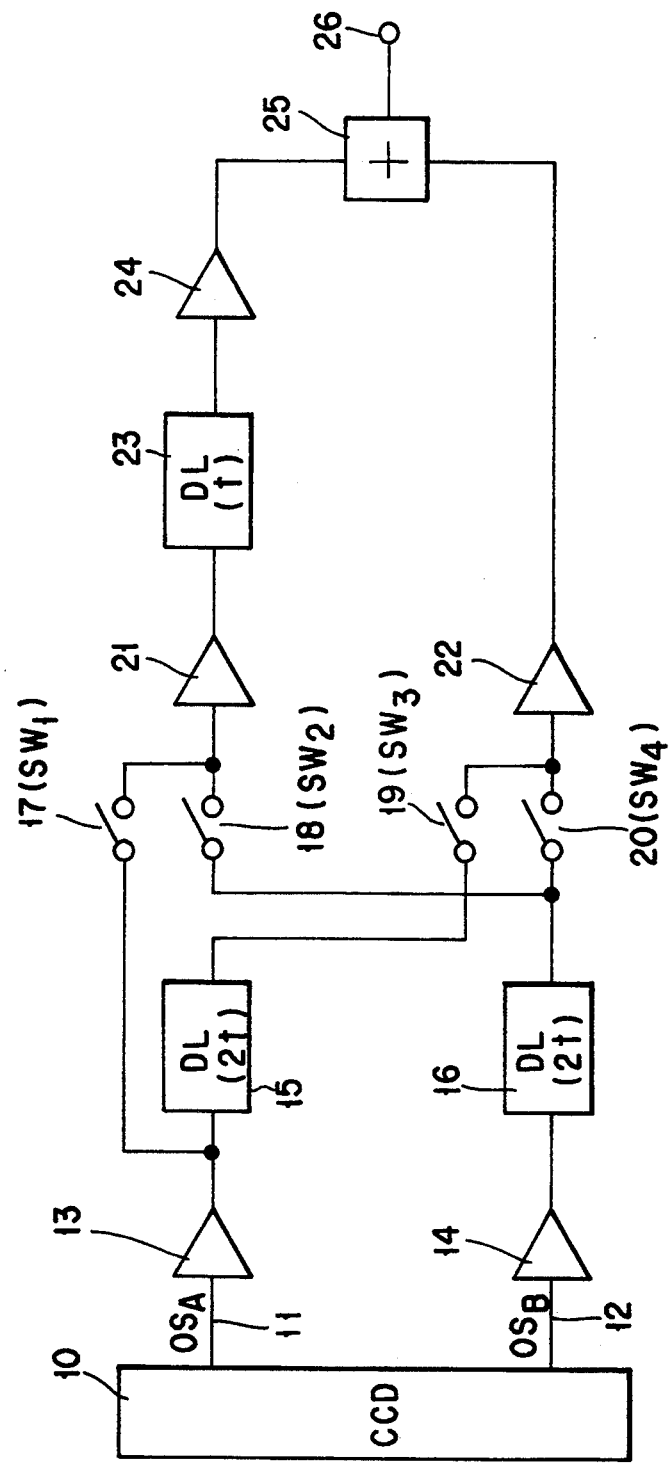
FIG. 1 is a circuit diagram showing an image signal processing apparatus according to a first embodiment of the present invention.

FIG. 1 shows an image signal processing apparatus according to the first embodiment of this invention, which has a pixel-fault correcting circuit. As is shown in FIG. 1, a CCD 10 has two output lines 11 and 12 for outputting two image signals $OS_A$ and $OS_B$. The image signals $OS_A$ and $OS_B$ are amplified by amplifiers 13 and 14 and then supplied, via delay lines 15 and 16 or directly to switches 17 ($SW_1$), 18 ($SW_2$), 19 ($SW_3$), and 20 ($SW_4$). The switches 18 to 20 select signals delayed for different periods of time.

More precisely, the output of the amplifier 13 is supplied to the switch 17 and hence to the switch 19 through the delay line 15. The output of the amplifier 14 is supplied via the delay line 16 to the switches 18 and 20. The switches 17 to 20 are controlled by a pulse produced by a pixel-fault address pulse generator (not shown).

The outputs of the switches 17 and 18 are supplied to an adder 25 through an amplifier 21, a delay line 23, and an amplifier 24. The outputs of the switches 19 and 20 are supplied through an amplifier 22 to the adder 25. The delay lines 15 and 16 have a delay time of 2t which is equivalent to the total delay time of two pixels. The delay line 23 has a delay time of t which is equivalent to the delay time of one pixel. The adder 25 adds the outputs of the amplifiers 22 and 24, generating a signal. The signal is output from an output terminal 26.

The image signal processing apparatus of FIG. 1 performs its function, as will be explained with reference to FIG. 2.

Figure 2:
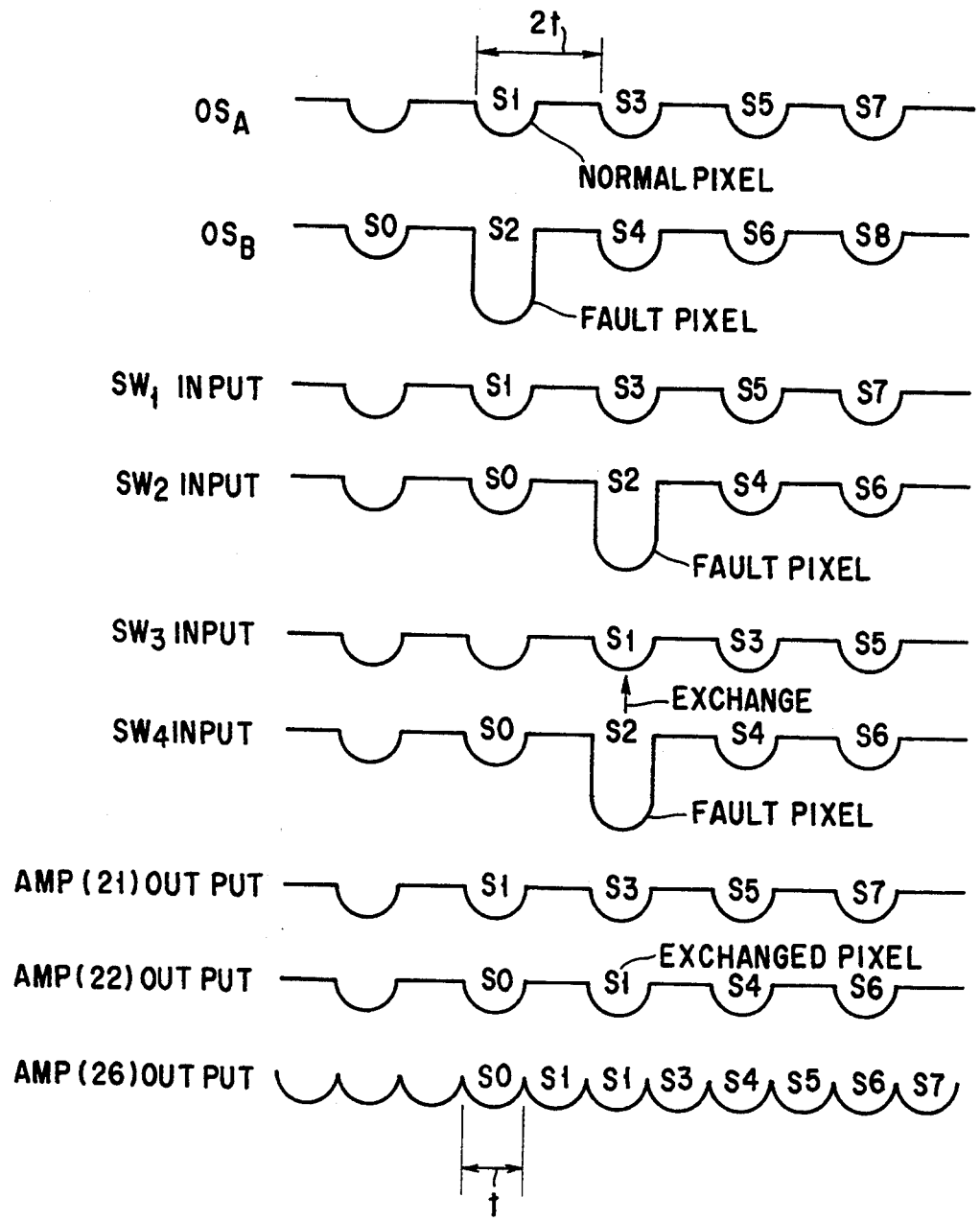
FIG. 2 is a timing chart explaining the operation of the apparatus shown in FIG. 1.

FIG. 2 is a timing chart showing the output signals $OS_A$ and $OS_B$ of the CCD 10, the signals input to the switches $SW_1$, $SW_2$, $SW_3$ and $SW_4$, the signals output from the amplifiers 21 and 22, and the signal output from the adder 25.

Symbols S0 to S7 shown in FIG. 2 indicate respectively pixel signals which are generated by the CCD 10 during an effective period. The pixel signal S2 is a fault pixel signal, whereas pixel signals S0, S1 and S3 to S7 are normal pixel signals. The outputs of the CCD 10 are in phase; the pixel signals S1 is of the same phase as the pixel signals S2, S3, S4, . . . The phase difference between the inputs of switches $SW_1$ and $SW_2$ is 2t, i.e., two-pixel delay time. The inputs of switch $SW_2$ and that of the switch $SW_4$ are obtained by delaying the output signal $OS_B$ for two-pixel delay time, and are of the same phase.

In this instance, the pixel signal S2, which is a fault one, is replaced with the normal pixel signal S1 preceding the pixel signal S2. More specifically, the switch $SW_2$ is turned off, the switch $SW_3$ is turned on, and the switch $SW_4$ is turned off. As a result, the amplifiers 21 and 22 output fault-less signals as is shown in FIG. 2. The output signal of the amplifier 21 is delayed for time t, i.e., one-pixel delay time, and then added to the output of the amplifier 22 by means of the adder 25. Hence, the adder 25 replaces the fault pixel signal S2 with the normal pixel signal. In other words, the fault pixel signal S2 has been corrected.

The fault correction will be described in greater detail, with reference to FIG. 3.

Figure 3:
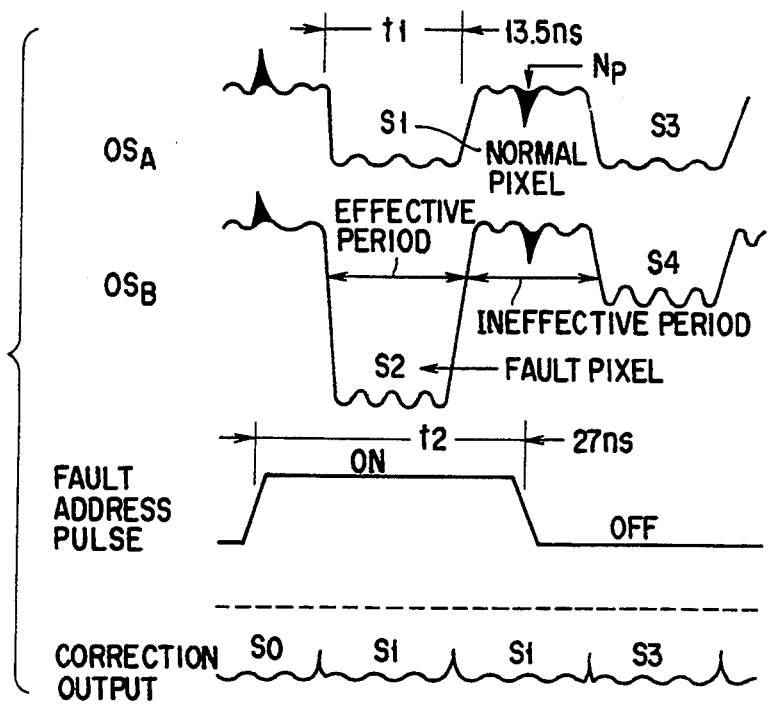
FIG. 3 is a diagram showing the waveforms of signals, explaining the operation of the apparatus shown in FIG. 1.

FIG. 3 is an enlarged view, showing the waveforms of the signals $OS_A$ and $OS_B$, the waveform of a correction pulse (i.e., a pixel-fault address pulse), and the waveform of the corrected signal.

To replace the fault pixel signal S2 with the normal pixel signal S1, a correction pulse controls the switches 17, 18 and 19, turning each switch on or off during the ineffective period of the CCD 10. The noise Np generated by changing over the switches 17 to 19 enters into the signal which the CCD 10 generates during its ineffective period. Therefore, any pixel signal output by the CCD 10 does not contain the noise Np.

In the present embodiment, if the CCD 10 has 2 million pixels and the effective period of each pixel signal output by the CCD 10 is 13.5 ns, the correction pulse can increase its pulse width by at most 27 ns, i.e., twice the effective period of the pixel signal. The pulse width of 27 ns is ten or more times greater than the width of the sampling pulses used in the sample-and-hold operation performed in the conventional image signal processing apparatus. This means that the apparatus shown in FIG. 1 can operate at ten or more times faster than the conventional image signal processing apparatus. Since the correction pulse controls the switches 17 to 20 during the ineffective period of any pixel signal, it does not affect a normal pixel signal even if it contains jitter. A fault pixel signal can, therefore, be corrected, with its high S/N ratio maintained.

The second embodiment of the invention, which is also a digital image signal processing apparatus, will now be described. This embodiment is designed for use in combination with a high-vision imaging device which has 2 million pixels and can correct two or more pixel faults at one position, at high speed without increasing noise. Even if the signals output by about ten fault pixels arranged close to one another are corrected, that portion of an image which have been reproduced from the corrected pixel signals can hardly be recognized.

Figure 4:
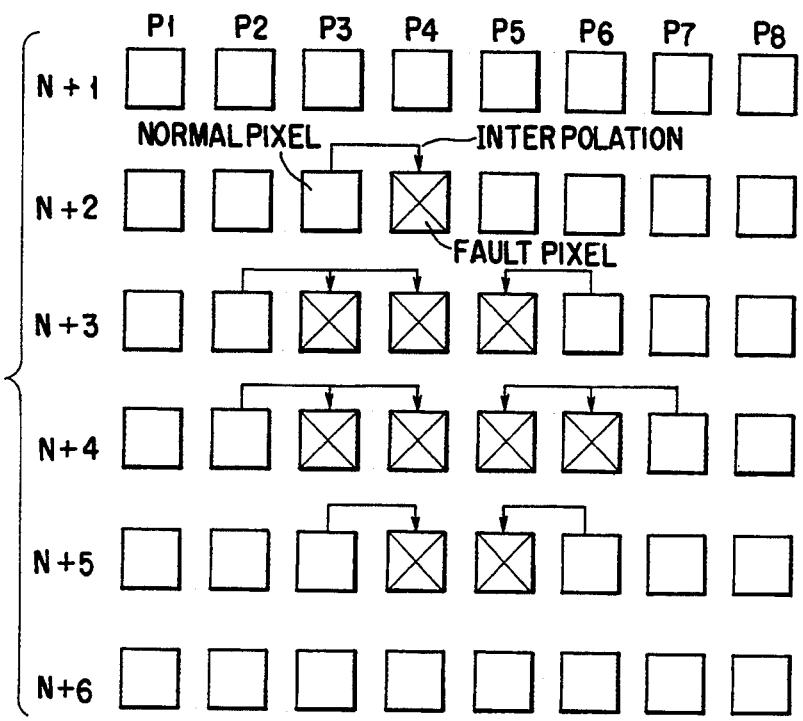
FIG. 4 is a diagram showing the positions of pixels involving in correction of pixel faults.

FIG. 4 shows 48 pixels, a part of the 2 million pixels incorporated in the high-vision CCD 50 (FIG. 5), which are arranged in six rows N+1 to N+6, each consisting of 8 pixels P1 to P8. As is indicated by marks X, the pixels includes ten fault pixels which are located close to one another. The signal output by each fault pixel is replaced by the signal output by a normal pixel of the same row, as is indicated by arrows shown in FIG. 4. In other words, the image signal processing apparatus according to the second embodiment of the invention can correct a plurality of pixel faults occurring at one position.

The apparatus and the operation it performs will be described in detail, with reference to FIG. 5, FIGS. 6A to 6K, and FIG. 7.

As is shown in FIG. 5, an image signal output by the CCD 50 is divided into five image signals, which are amplified by five amplifiers 51 to 55, respectively. The output signal of the amplifier 51 is supplied to an amplifier 60. The output signals of the amplifiers 52 to 55 are delayed by delay lines 56, 57, 58 and 59 and supplied to amplifiers 61, 62, 63 and 64. The delay lines 56, 57, 58 and 59 have a one-pixel delay time, a two-pixel delay time, a three-pixel delay time, and a four-pixel delay time, respectively.

The output signals of the amplifiers 60 to 64 are output through switches 65 to 69 and through an amplifier 70, while the switches 65 to 69 remain on. The switches 65 to 69 are controlled by fault correction pulses which have been generated from the data stored in a ROM 71. Correction data is read from the ROM 71 when an address generator 72 drives the ROM 71. The correction data is input to a fault selector 74 and a horizontal address counter 75. The signals output by the selector 74 and the counter 75 are input to a pulse shaper 76. The pulse shaper 76 produces a fault correction pulse in accordance with the type of the fault selected by the selector 74 and the horizontal address output by the counter 75.

The address generator 72 is connected to the ROM 71 by an address line 77. The ROM 71 is connected to the horizontal address counter 75 by a code line 78, and to the fault selector 74 by a code line 79. The address line 77 and the code lines 78 and 79 are excited during the horizontal blanking period only, so that synchronous noise is prevented from entering the fault correction pulse which is supplied from the pulse shaper 76 to the switches 65 to 69 through a correction pulse line 80. The correction data is formed from the data representing the positions of the fault pixels which have been detected by inspecting all pixels incorporated in the CCD 50. If any pixel becomes a fault one during the use of the CCD 50, the correction data stored in the ROM 71 is updated.

Figure 6:
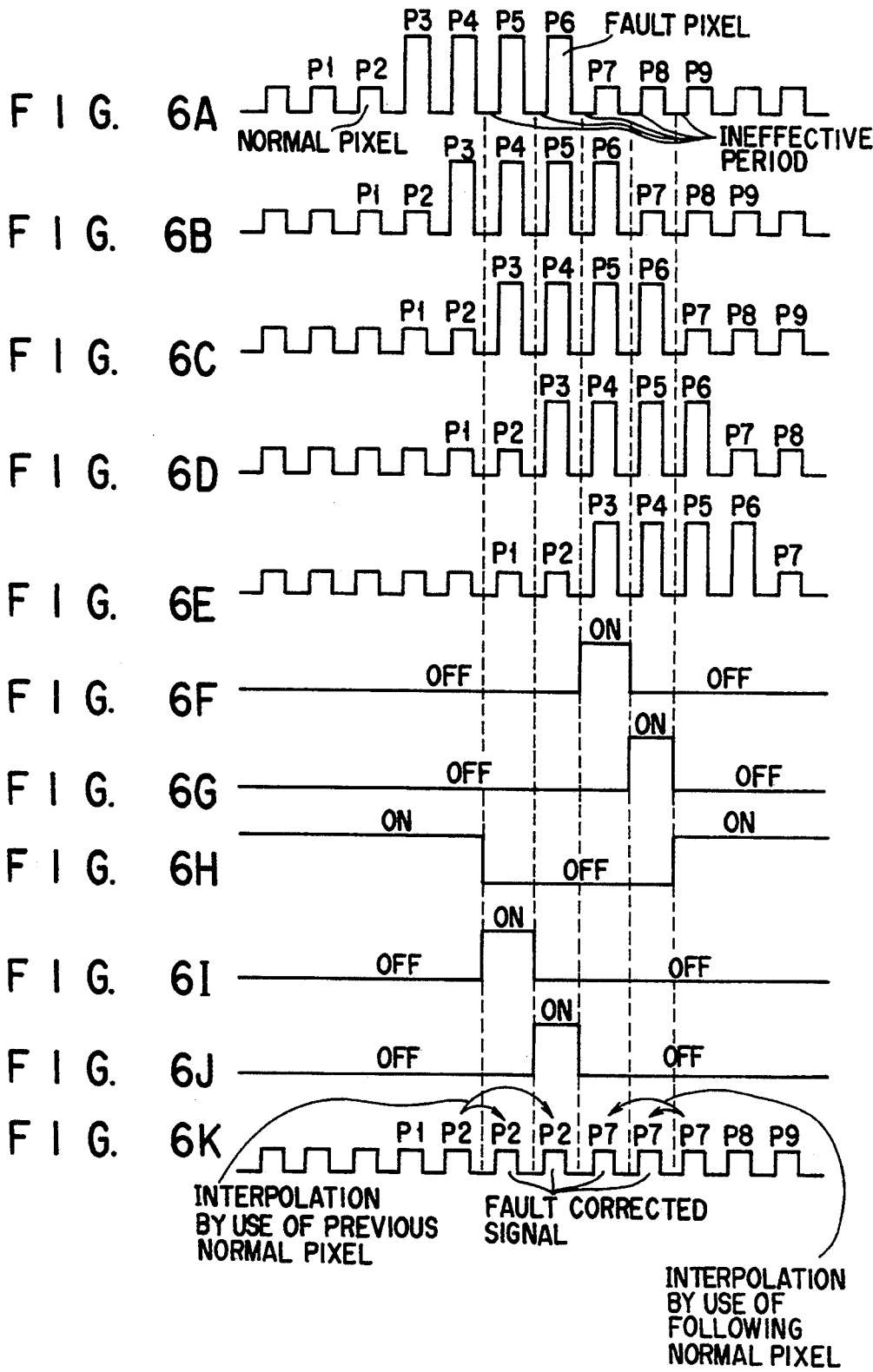
FIGS. 6A to 6K are a timing chart explaining how the apparatus of FIG. 5 correct pixel faults.

With reference to the timing chart formed by FIGS. 6A to 6K, it will be described how the circuit of FIG. 5 replaces the signals output by the fault pixels included in the row N+4 (FIG. 4), with the normal pixel signals output by the normal pixels of the same row. Shown in FIGS. 6A to 6E are the waveforms of the five signals input to the switches 65 to 69. Shown in FIGS. 6F to 6J are the five correction pulses supplied to the switches 65 to 69. Shown in FIG. 6K is the output of the amplifier 70, which has a corrected waveform.

Of the pulses P1 to P8 shown in FIGS. 6A to 6E and FIG. 6K, the pulses P1 to P9 correspond to the pixels P1 to P8 forming the row N+4. As is shown in FIG. 4, this row consists of four normal pixels P1, P2, P7 and P8, and four fault pixels P3, P4, P5 and P6. The pixel signals output from the amplifiers 60 to 64, which have been delayed by different periods, are supplied to the switches 65 to 69. Each of the switches 65 to 69 is turned on and off during the ineffective period of the pixel signal, and remain on longer than the effective period of the pixel signal.

FIGS. 6F to 6J illustrate the timing of turning the switches 65 to 69 on and off. When the switches 65 to 69 are so turned on and off, the amplifier 70 outputs an image signal which is comprised of eight normal pixel signals, i.e., the signals P1, P2, P2, P2, P7, P7, P7 and P9 as is shown in FIG. 6K. To be more specific, as the image signals shown in FIGS. 6A to 6E, each delayed by one-pixel delay time from the preceding one, are input to the switches 65 to 69, while the switches 65, 66, 68 and 69 remain off and the switch 67 remains on, only the pixel signal P2 shown in FIG. 6C is output to the amplifier 70. When the switch 68 is turned on, only the pixel signal P2 shown in FIG. 6D is output to the amplifier 70. As the switches 65 to 69 are sequentially turned on, the fault pixel signals P3 and P4 are each replaced by the preceding normal pixel signal P2, and the fault pixel signals P5 and P6 are replaced by the succeeding normal pixel signal P7. As a result, the amplifier 70 outputs the normal image signal (FIG. 6K) which contains no fault pixel signals.

As the image signals generated by any other row N+2, N+3 or N+5 including at least one fault pixel are supplied from the amplifiers 60 to 64, the switches 65 to 69 are switched in a similar way under the control of the fault correction pulses generated from the data stored in a ROM 71. Hence, the signal output by the fault pixel is replaced by the signal output by the normal pixel of the same row. As a result, the signals generated by the ten fault pixels located close to each other as is shown in FIG. 4 are replaced by the normal pixel signals. In other words, the ten pixel faults are corrected.

In FIGS. 6A to 6K, the pixel signals are shown as positive ones for simplicity of explanation. In fact, however, the pixels are negative signals as is shown in FIG. 2.

Figure 7:
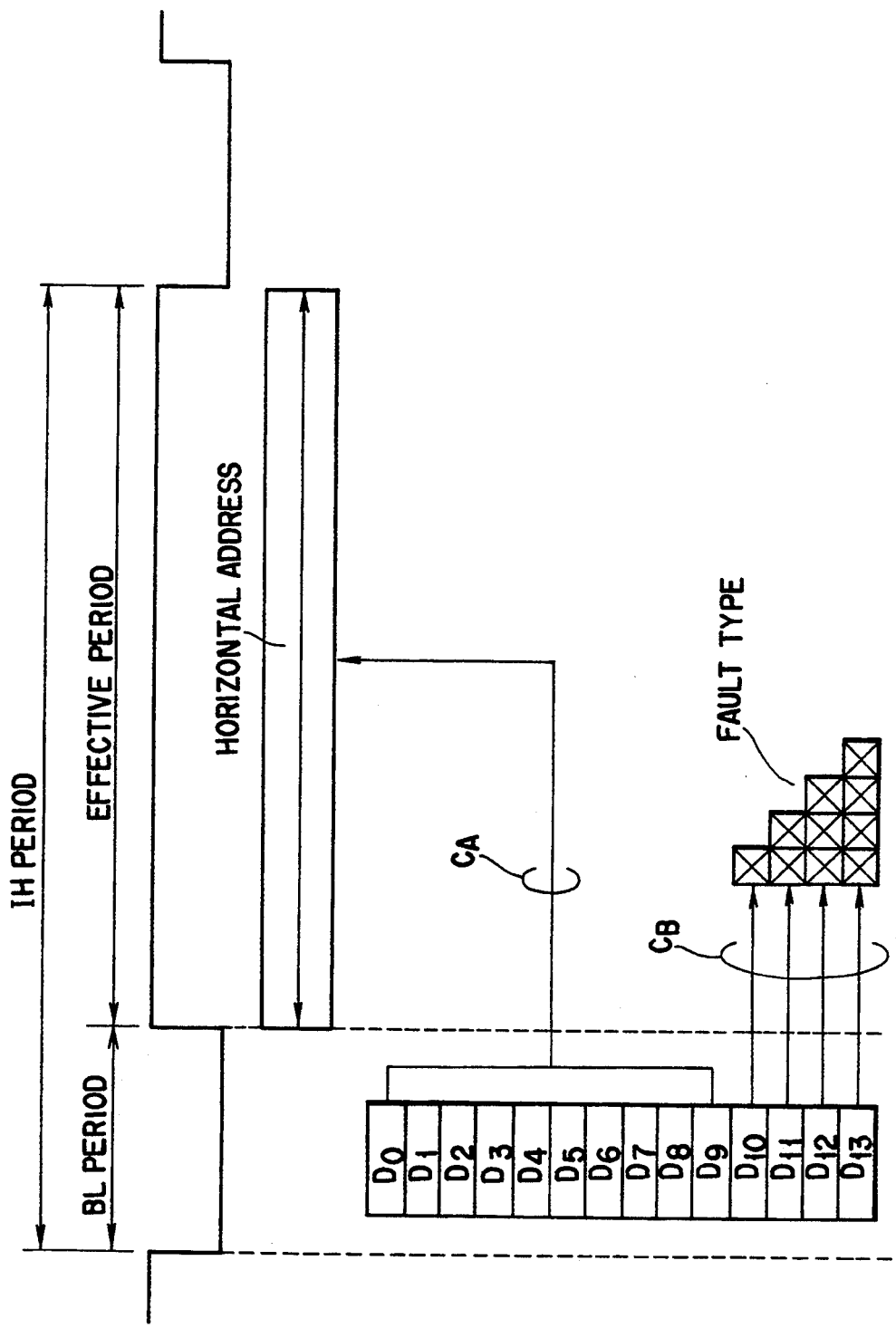
FIG. 7 is a diagram explaining the basic operation of the apparatus shown in FIG. 5.

The fault correction pulse output by the pulse shaper 76 contains little noise. With reference to FIG. 7, it will now be described how to generate the correction pulse.

Code data items D0 to D13 are read from the ROM 71 during the blanking (BL) period of a horizontal scanning period (1H period) and supplied to the horizontal address counter 75. The counter 75 generates an address pulse in accordance with the code data items D0 to D13. The address pulse is supplied to the pulse shaper 76. In other words, the horizontal address code $C_A$ for the next horizontal scanning line is read from the ROM 71. The address code CA controls the set input of the horizontal address counter 75. The counter 75 thereby outputs a carry, which is used as an address pulse. During the blanking period, the pulse shaper 76 combines the address pulse with a fault type code $C_B$ representing the type of fault, thus forming such fault correction pulses as are shown in FIG. 6F, 6G, 6H, 6I and 6J. The fault correction pulses are supplied to the switches 65 to 69 through the correction pulse line 80 and turn the switches 65 to 69 on during the blanking period. As a result, the signals output by the fault pixels included in the row are replaced by the signals output by the normal pixels of the same row, as can be understood from FIGS. 6A to 6K, during the effective period of the horizontal scanning period (1H). Noise is thereby prevented from entering the code lines 78 and 79 which connect the ROM 71 to the horizontal address counter 75 and the fault selector 74, respectively. This noise prevention results in a great advantage, particularly in the case where the fault selector 74 is made of an LSI circuit. If the counter 75 is a gray code counter, the leading and trailing edges of the fault correction pulses can be dispersed along the time axis, thereby to reduce noise even more.

The code data items D0 to D13 stored in the ROM 71 as is shown in FIG. 7 are classified into two types. The code data items D0 to D9 are of the first type, representing horizontal addresses, and the code data items D10 to D13 are of the second type, representing the types of faults. The code data items D0 to D13 are read from the ROM 71 during the blanking period.

The second embodiment of the invention can not only perform its function at high speed without increasing noise, as does the first embodiment. But also can it correct a plurality of pixel faults occurring at one position. The image signal processing apparatus according to the second embodiment is therefore useful as an image signal correcting circuit for use in combination with a solid-state imaging device such as a high-vision CCD, which has a great number of pixels and the output signals of which need to be processed at high speed without increasing noise.

A third embodiment of the invention, which is also a digital image signal processing apparatus, will now be described. The third embodiment is designed for use in combination with a high-vision CCD which has 2,000,000 pixels arranged in 2,000 rows and 1,000 columns and which has two output lines, and which outputs signals at 37.125 MHz. This image signal processing apparatus can correct many pixel faults at high speed and can reduce the noise contained in each pixel signal. More specifically, the third embodiment can correct one to three fault pixel signals generated in the same row of pixels.

The third embodiment can correct pixel faults in various methods. These methods will be explained, with reference to FIGS. 8A to 8C, FIGS. 9A to 9C, FIGS. 10A to 10C, and FIGS. 11A to 11C. In these figures, "A" and "B" indicate signals $OS_A$ and $OS_B$ output by a CCD, respectively, "OUTPUT" denotes a signal corrected, the mark "X" represents a fault pixel, and the arrow shows which fault pixel signal is replaced by which normal pixel.

Figure 8A:
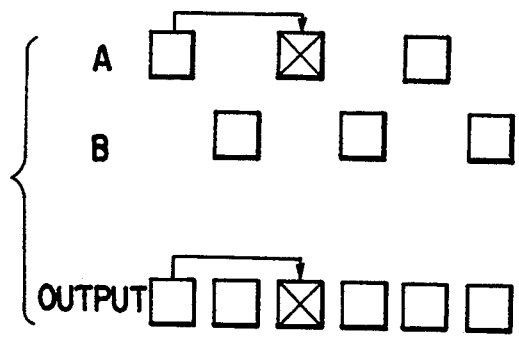
FIGS. 8A to 8C are a diagram explaining the first method of replacing a fault pixel signal with a normal pixel signal.
Figure 9A:
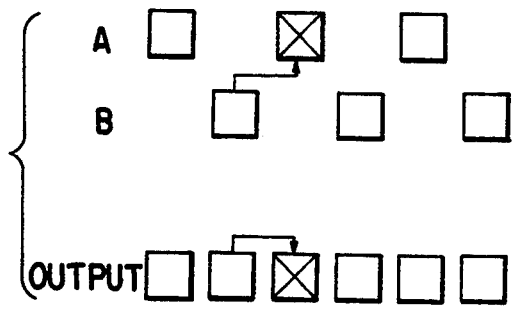
FIGS. 9A to 9C are a diagram explaining the second method of replacing a fault pixel signal with a normal pixel signal.
Figure 8B:
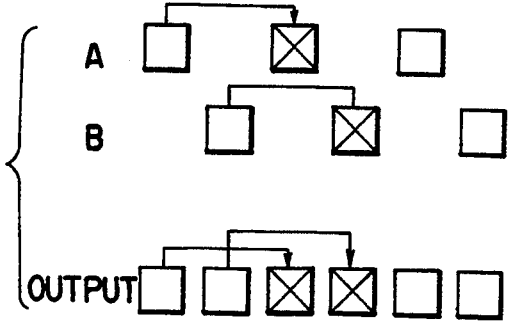
Figure 9B:
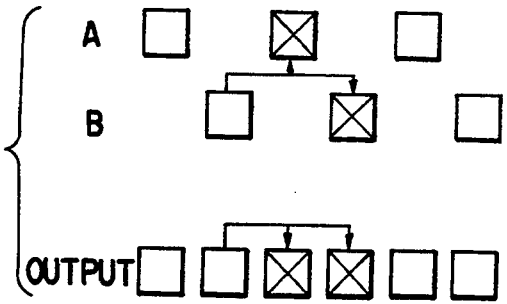
Figure 8C:
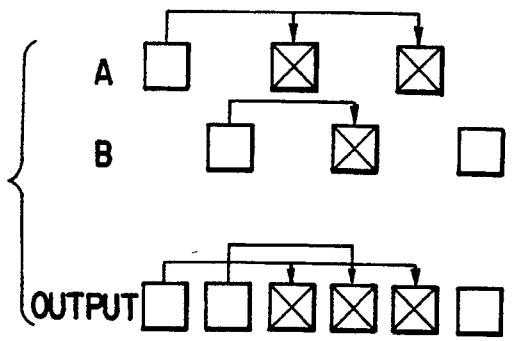
Figure 9C:
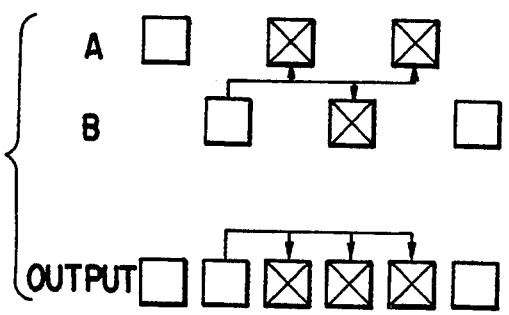
Figure 10A:
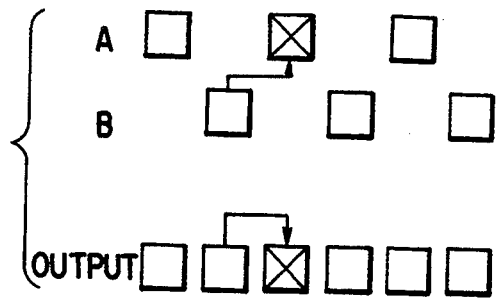
FIGS. 10A to 10C are a diagram explaining the third method of replacing a fault pixel signal with a normal pixel signal.
Figure 11A:
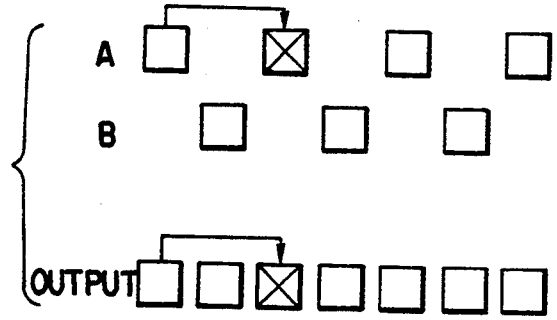
FIGS. 11A to 11C are a diagram explaining the fourth method of replacing a fault pixel signal with a normal pixel signal.
Figure 10B:
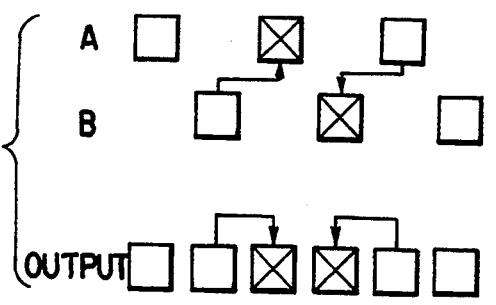
Figure 11B:
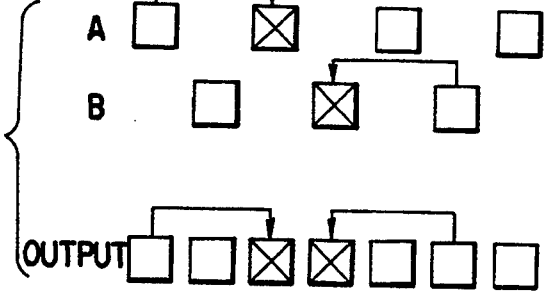
Figure 10C:
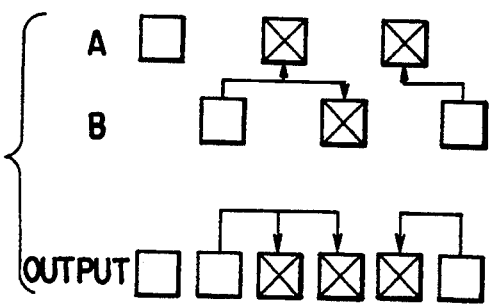
Figure 11C:
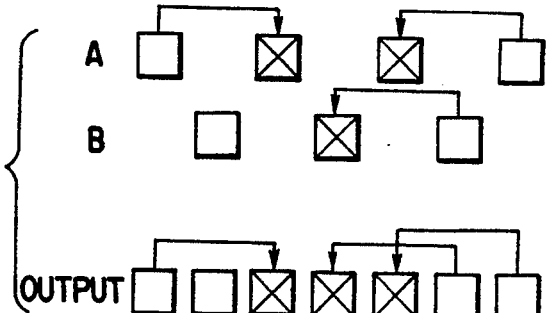

FIGS. 8A, 8B and 8C explain the method in which the signal output by any fault pixel is replaced by the signal output by the preceding normal pixel of the same row. FIGS. 9A, 9B and 9C explain the method in which the pixel signal output by any fault pixel is replaced by the pixel signal output by a normal pixel of the next row and preceding the fault pixel, and the pixel signal output by a fault pixel, if any in a row, is replaced by the pixel signal output by the immediately preceding normal pixel of the same row. FIGS. 10A, 10B and 10C explains the method in which the pixel signal output by any fault pixel is replaced by the pixel signal output by a normal pixel of the next row and preceding or succeeding the fault pixel, and the pixel signal output by a fault pixel, if any in a row, is replaced by the pixel signal output by the immediately preceding normal pixel of the same row. FIG. 11A, 11B and 11C explains the method in which the pixel signal output by any fault pixel is replaced by the pixel signal output by a normal pixel of the same row and preceding or succeeding the fault pixel, and the pixel signal output by a fault pixel. FIGS. 8A, 9A, 10A and 11A illustrate the case where the pixel signal output by one fault pixel is corrected. FIGS. 8B, 9B, 10B and 11B show the case where the pixel signals output by two fault pixels are replaced by normal pixel signals. And FIGS. 8C, 9C, 10C and 11C show the case where the pixel signals output by three fault pixels are replaced by normal pixel signals.

Any one of the various methods described above can be selected in accordance with the size of the pixel-fault correcting circuit incorporated in the apparatus and also on the quality of pixel signals output by the CCD.

Figure 12:
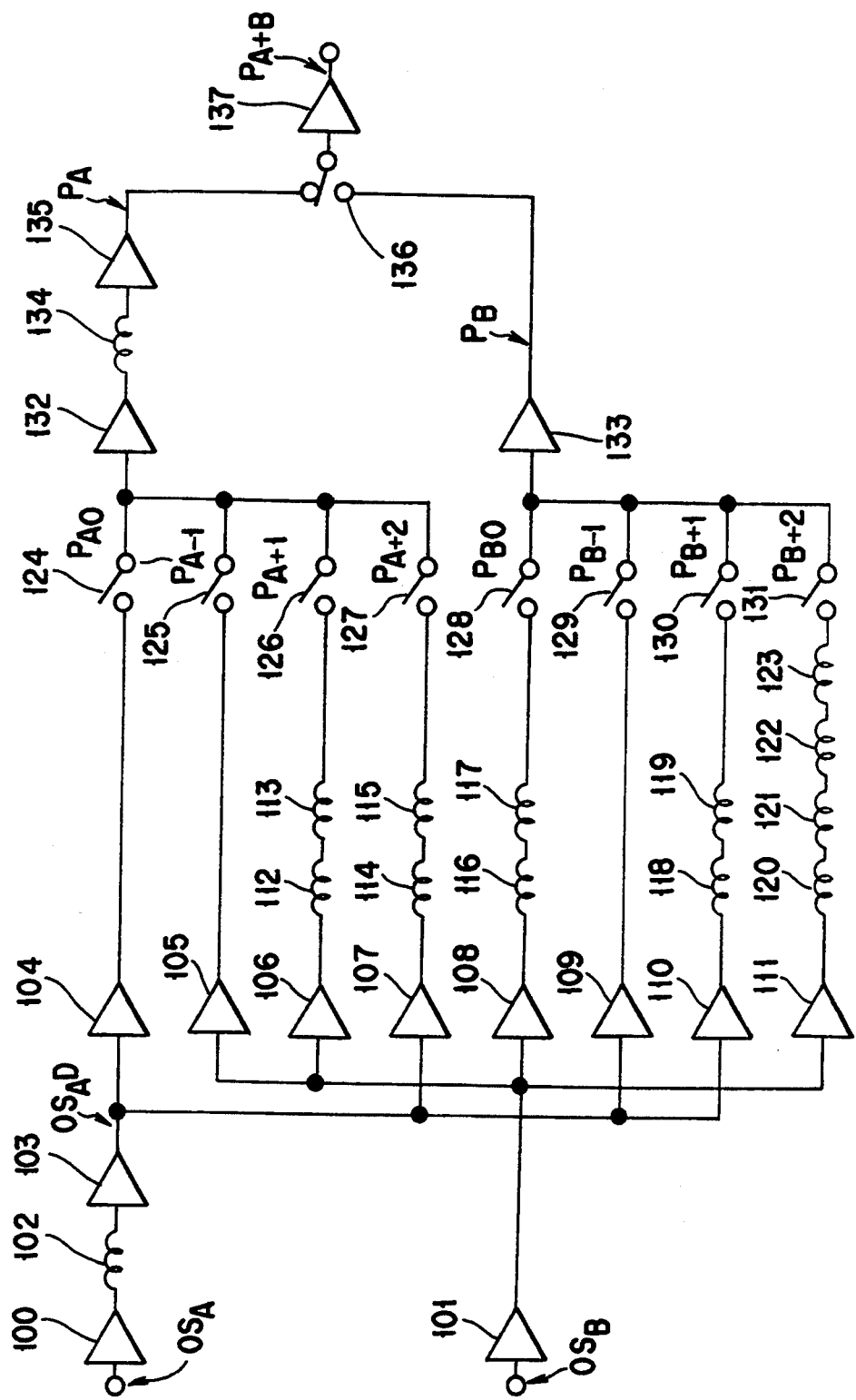
FIG. 12 is a diagram showing the pixel-fault correcting circuit incorporated in an image signal processing apparatus according to a third embodiment of this invention.
Figure 13:
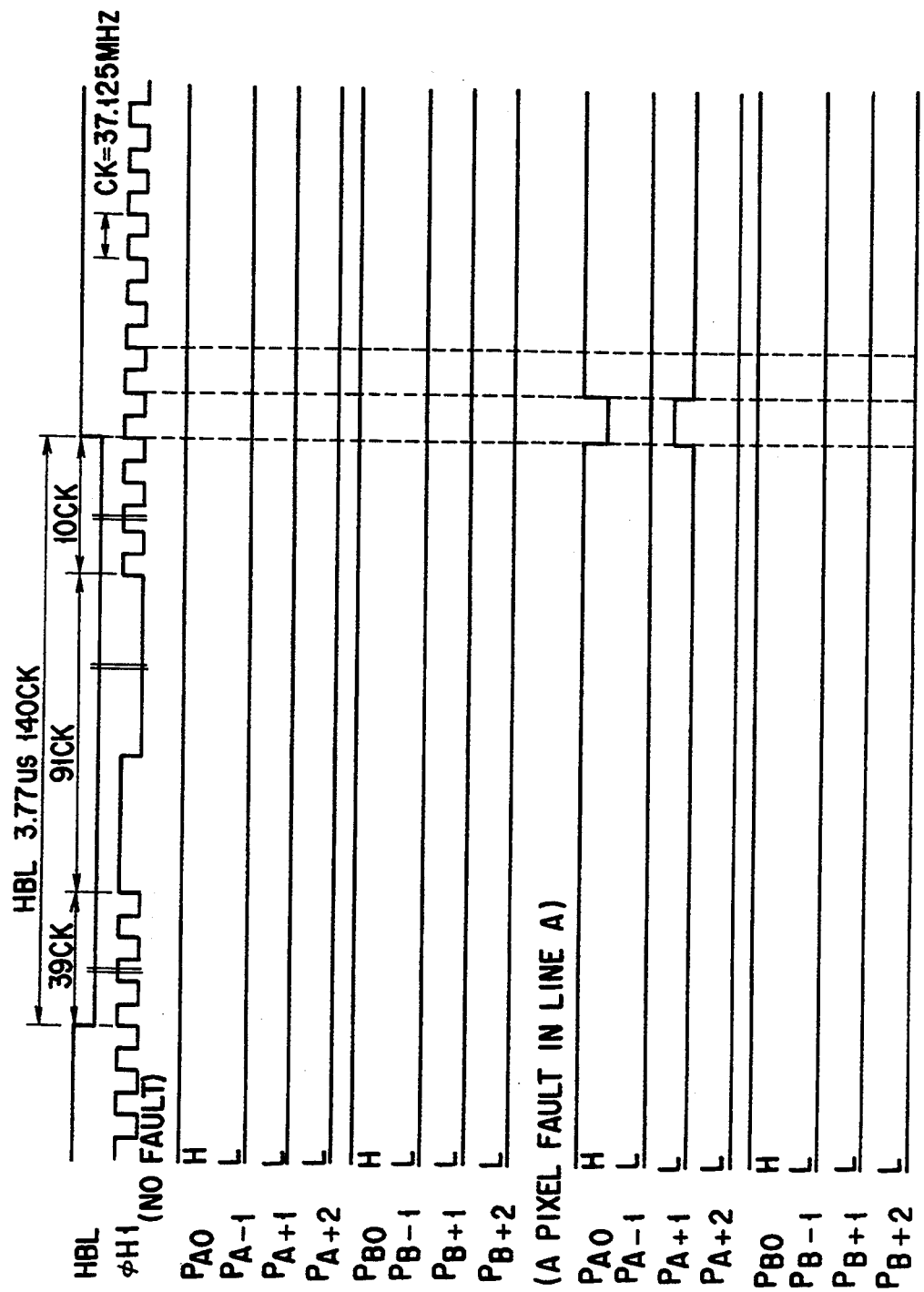
FIG. 13 is a timing chart explaining how the circuit shown in FIG. 12 corrects a pixel fault in line A.
Figure 15:
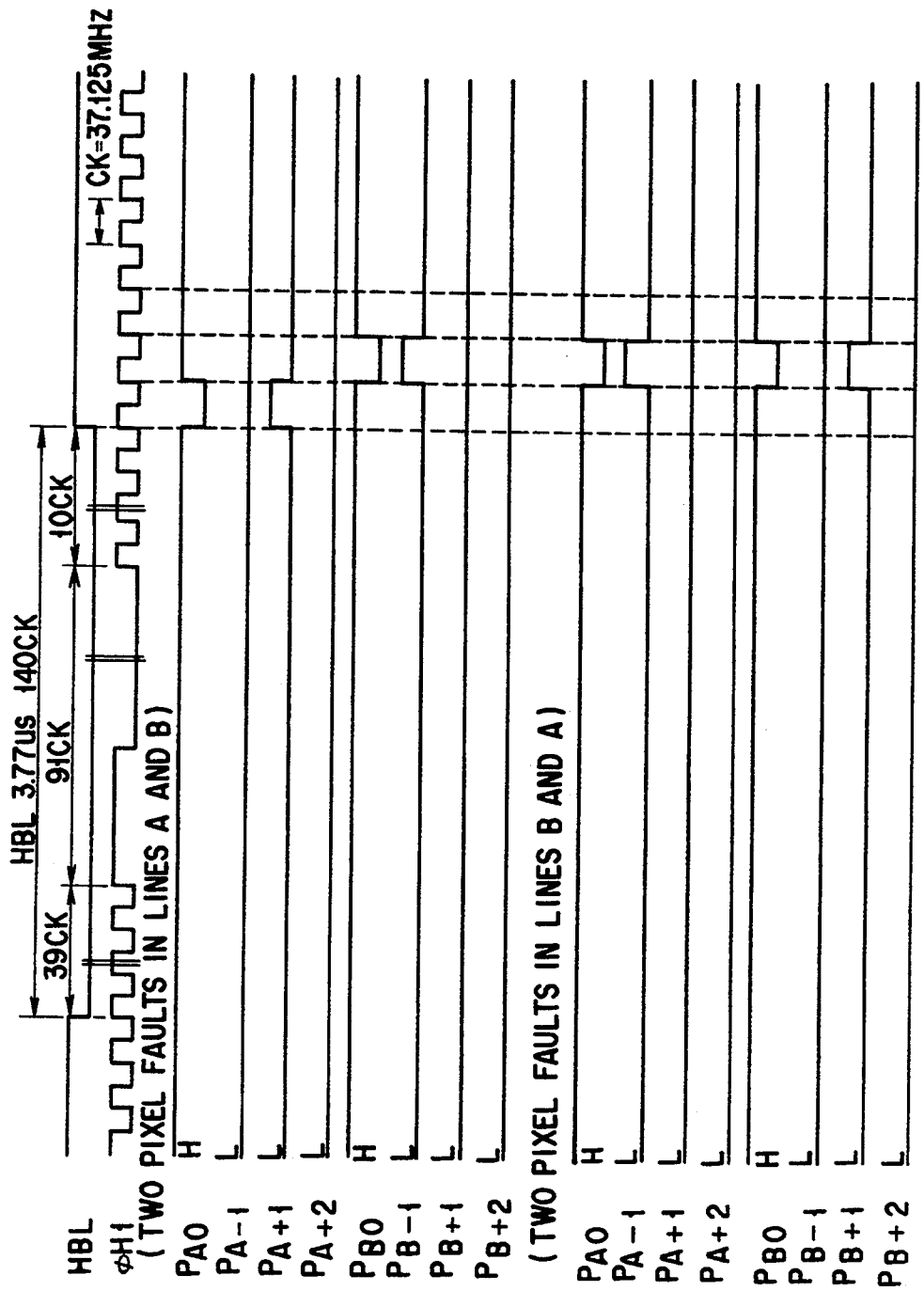
FIG. 15 is also a timing chart explaining how the circuit of FIG. 12 corrects two pixel faults, sequentially in lines A and B, or sequentially in lines B and A.
Figure 16:
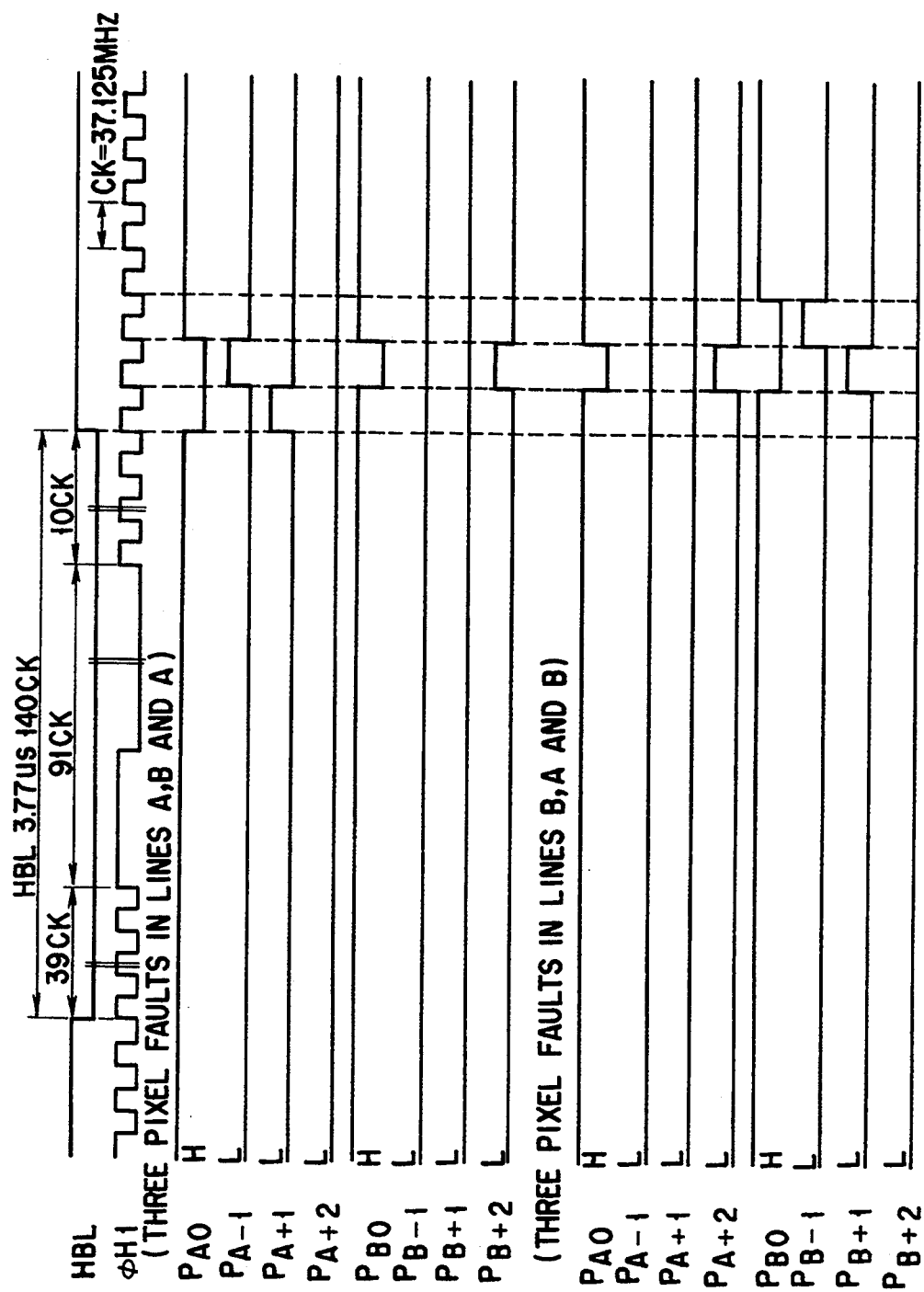
FIG. 16 is also a timing chart explaining how the circuit of FIG. 12 corrects three pixel faults, sequentially in lines A, B and A, or sequentially in lines B, A and B.
Figure 18A:
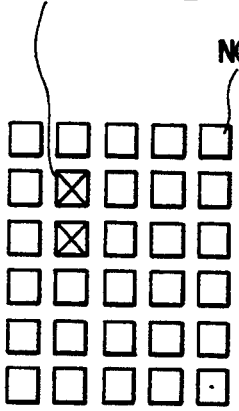
FIGS. 18A to 18I are diagrams explaining how to correct the faults occurring at the pixels of different rows.
Figure 18B:
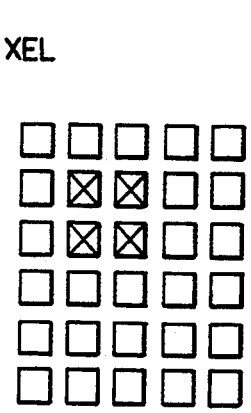
Figure 18C:
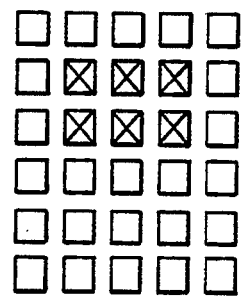
Figure 18D:
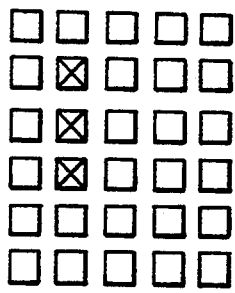
Figure 18E:
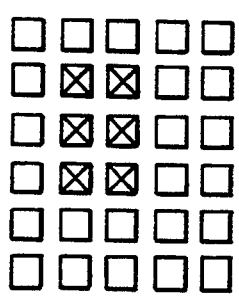
Figure 18F:
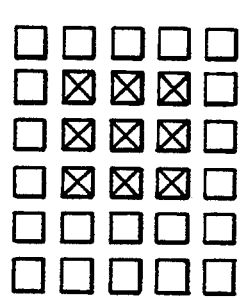
Figure 18G:
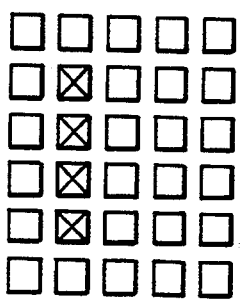
Figure 18H:
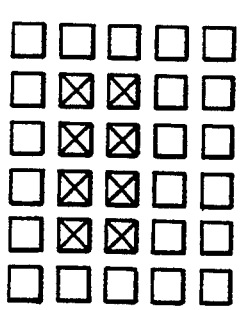
Figure 18I:
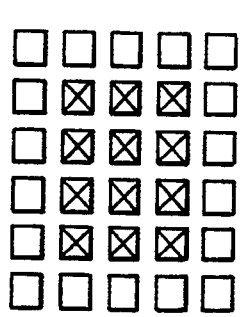

The method illustrated in FIGS. 10A to 10C will be explained in detail, with reference to FIG. 12, FIGS. 13 to 16, FIGS. 17A to 17F, and FIGS. 18A to 18I. FIG. 12 shows a pixel-fault correcting circuit used in the method. FIGS. 13 to 16 illustrate when and how the switches PA0 to PB+2 incorporated in the pixel-fault correcting circuit are turned on and off. FIGS. 17A to 17F illustrate how pixel faults are corrected in various conditions. FIGS. 18A to 18I are diagrams, each showing a pixel matrix including fault pixels.

As is shown in FIG. 12, a buffer 100 which receives a signal $OS_A$ is connected by a delay line 102 to a buffer 103. The output of the buffer 103 is connected to the inputs of buffers 104, 107, 109 and 110. A buffer 101 which receives a signal $OS_B$ is connected at its output to the inputs of buffers 105, 106, 108 and 111. The outputs of the buffers 104, 105 and 109 are connected to changeover switches 124, 125 and 129, respectively. The output of the buffer 106 is connected by series-connected delay lines 112 and 113 to a changeover switch 126; that of the buffer 107 is connected by series-connected delay lines 114 and 115 to a changeover switch 127; that of the buffer 108 is connected by series-connected delay lines 116 and 117 to a changeover switch 128; and that of the buffer 110 is connected by series-connected delay lines 118 and 119 to a changeover switch 130. The output of the buffer 111 is connected by series-connected delay lines 120, 121, 122 and 123 to a changeover switch 131. The switches 124, 125, 126, and 127 are connected at their outputs, forming an output node. The output node of the switches 124 to 127 is connected to a buffer 132, which in turn is connected by a delay line 134 to a buffer 135. The switches 128, 129, 130 and 131 are connected at their outputs, forming an output node. The output node of the switches 128 to 131 is connected to a buffer 133. The outputs of the buffers 135 and 133 are connected the stationary contacts of a changeover switch 136, the movable contact of which is connected to a buffer 137.

The changeover switch 124 to 131 are controlled by fault correction pulses PA0, $P_{A-1}$, $P_{A+1}$, $P_{A+2}$, $P_{B0}$, $P_{B-1}$, $P_{B+1}$, and $P_{B+2}$, respectively. These pulses are supplied to the switches 124 to 131 at such times as is shown in FIGS. 13 to 16, whereby fault pixels are corrected as has been explained with reference to FIGS. 10A to 10C. More precisely, the fault correction pulses are supplied to the switches 124 to 131 at the times specified in FIG. 13 in the case where there is no fault pixel in the CCD; they are supplied to the switches 124 to 131 at the times specified in FIG. 14 in the case where the row A includes only one fault pixel as is shown in FIG. 10A; they are supplied to the switches 124 to 131 at the times specified in FIG. 15 in the case where the rows A and B include one fault pixel each, as is shown in FIG. 10B; and they are supplied to the switches 124 to 131 at the times specified in FIG. 16 in the case where the rows A and B include two fault pixels and one fault pixel, respectively, as is shown in FIG. 10C.

In FIGS. 13 to 16, HBL indicates a horizontal blanking period, and $\phi H1$ denotes a horizontal transfer pulse. "H" and "L," both shown in FIGS. 13 to 16, represent the high level and low level of the fault correction pulses PA0, $P_{A-1}$, $P_{A+1}$, $P_{A+2}$, $P_{B0}$, $P_{B-1}$, $P_{B+1}$, and $P_{B+2}$. When each fault correction pulse is at the H level, the switch receiving the pulse is on. Conversely, when the pulse is at the L level, the switch receiving the pulse is off.

FIGS. 17A to 17F explain how the circuit of FIG. 12 correct pixel faults, by turning the changeover switches 124 to 131 on and off at the times specified in FIGS. 13 to 16. In FIGS. 17A to 17F, the mark X denotes a fault pixel, $OS_A$ and $OS_B$ designate the two image signals output by the CCD, and $P_{A+B}$ represents a signal corrected. Also in FIGS. 17A to 17F, SD designates a fault pixel signal, and each arrow shows which fault pixel signal is replaced by which normal pixel.

FIG. 17A illustrates how one pixel fault occurring in the row A of pixels is corrected; more precisely, this figure shows how the pixel signal output by the fault pixel A2 of the row A is replaced by the pixel signal output by the normal pixel B1 of the row B. FIG. 17B explains how one pixel fault occurring in the row B of pixels is corrected; more precisely, FIG. 17B shows how the pixel signal output by the fault pixel B2 of the row B is replaced by the pixel signal output by the normal pixel A2 of the row A. FIG. 17C explains how two pixel faults occurring in the rows A and B, respectively, are corrected; more precisely, FIG. 17C shows how the pixel signal output by the fault pixel A2 of the row A and the pixel signal output by the fault pixel B2 of the row B are replaced by two normal pixel signals. FIG. 17D illustrates how two pixel signals sequentially output by a fault pixel of the row B and a fault pixel of the row A are replaced by normal pixel signals. FIG. 17E explains how three pixel signals output by the row A, the row B, and the row A are replaced by normal pixel signals. FIG. 17F explains how three pixel signals output by the row B, the row A, and the row B are replaced by normal pixel signals.

The pixel-fault correction described above will be explained in greater detail. In the case shown in FIG. 17A, for example, the signal $OS_B$ is delayed by a two-pixel delay time by means of the delay lines 112 and 113, and the changeover switches 124 and 126 are turned off and on, respectively, when the fault pixel A2 and the normal pixel B1 simultaneously generate a fault pixel signal and a normal pixel signal. As a result, the fault pixel generated by the pixel A2 is replaced by the normal pixel signal generated by the pixel B1. Similar operations are sequentially carried out, also in the cases shown in FIGS. 17B to 17F, whereby one to three fault pixel signals are replaced by one to three normal pixel signals.

If this sequence of operations is performed m times, each time for one row consisting of n pixels, then at most n (horizontal)×m (vertical) pixel faults can be corrected. FIGS. 18A to 18I show pixel matrices, each including 1 (horizontal)×2 (vertical) fault pixels to 3×4 fault pixels. The pixel signals output by these fault pixels can be replaced with normal pixel signals by the pixel-fault correcting circuit shown in FIG. 12. The third embodiment of the present invention can, therefore, correct pixel faults occurring in a high-vision CCD.

Figure 19:
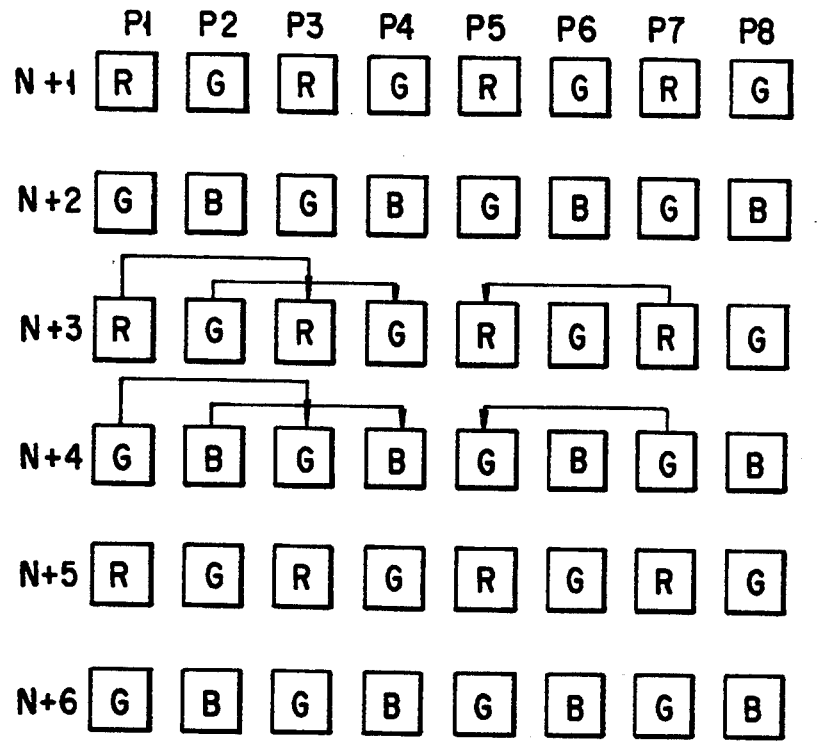
FIG. 19 is a diagram illustrating the pixel arrangement in a single-plate color CCD.

The third embodiment may be used in combination with a single-plate color CCD which has such a pixel matrix as is shown in FIG. 19.

As is shown in FIG. 19, the single-plate color CCD has six rows N+1 to N+6 of pixels, each consisting of 8 pixels P1 to P8, red filters R, green filters G, and blue filters B. Each pixel is covered with one color filter. The color filters are arranged in Bayer pattern which is well known in the art. As can be understood from the arrows shown in FIG. 19, the pixel signal output by any fault pixel is replaced by the pixel signal generated by the nearest normal pixel covered with a filter of the same color. When used in combination with a single-plate color CCD, too, the third embodiment of the invention can correct two or more pixel faults occurring at one position, while reducing the noise contained in each pixel signal.

Figure 20:
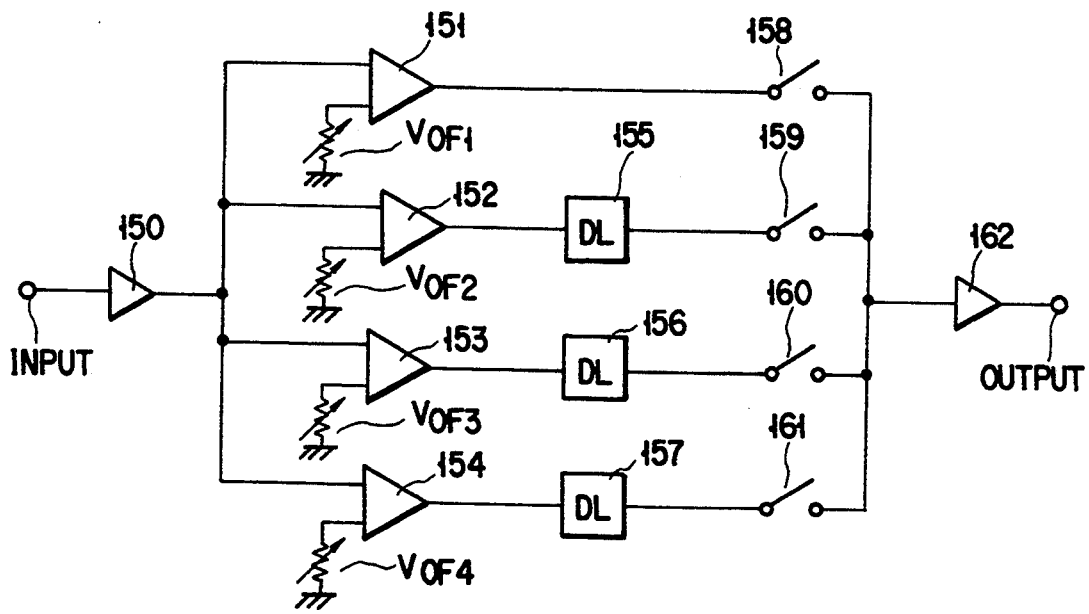
FIG. 20 is a diagram showing the pixel-fault correcting circuit incorporated in an image signal processing apparatus according to a fourth embodiment of the invention.

A digital image signal processing apparatus according to a fourth embodiment of this invention will now be described, with reference to FIG. 20 and FIGS. 21A to 21E. FIG. 20 shows the pixel-fault correcting circuit incorporated in the fourth embodiment, which can reliably correct pixel faults. FIGS. 21A to 21E are a timing chart explaining how the pixel-fault correcting circuit performs offset correction As is evident from FIG. 20, the output of a buffer amplifier 150 is connected to the first inputs of four buffer amplifiers 151 to 154. The second inputs of the buffer amplifiers 151 to 154 are connected to the ground by offset adjusters $V_{OF1}$, $V_{OF2}$, $V_{OF3}$ and $V_{OF4}$, respectively. The output of the buffer amplifier 151 is connected by a switch 158 to an output buffer amplifier 162. The outputs of the buffer amplifiers 152, 153 and 154 are connected to the output buffer 162, by a delay line 155 and a switch 159 connected in series, by a delay line 156 and a switch 160 connected in series, by a delay line 157 and a switch 161 connected in series, respectively.

In the circuit of FIG. 20, the signal input to the buffer amplifier 150 is divided into four parts, and these parts are converted into four signals delayed by different times. The switches 158 to 161 are controlled in accordance with the size of a fault pixel, thereby replacing the pixel signal output by the fault pixel with the pixel signal output by a normal pixel. There may be an offset between two input pixel signals. Such an offset results in noise which will remain in the normal pixel signal which has replaced the fault pixel signal. The circuit shown in FIG. 20 eliminates this noise in the following way.

Figure 21:
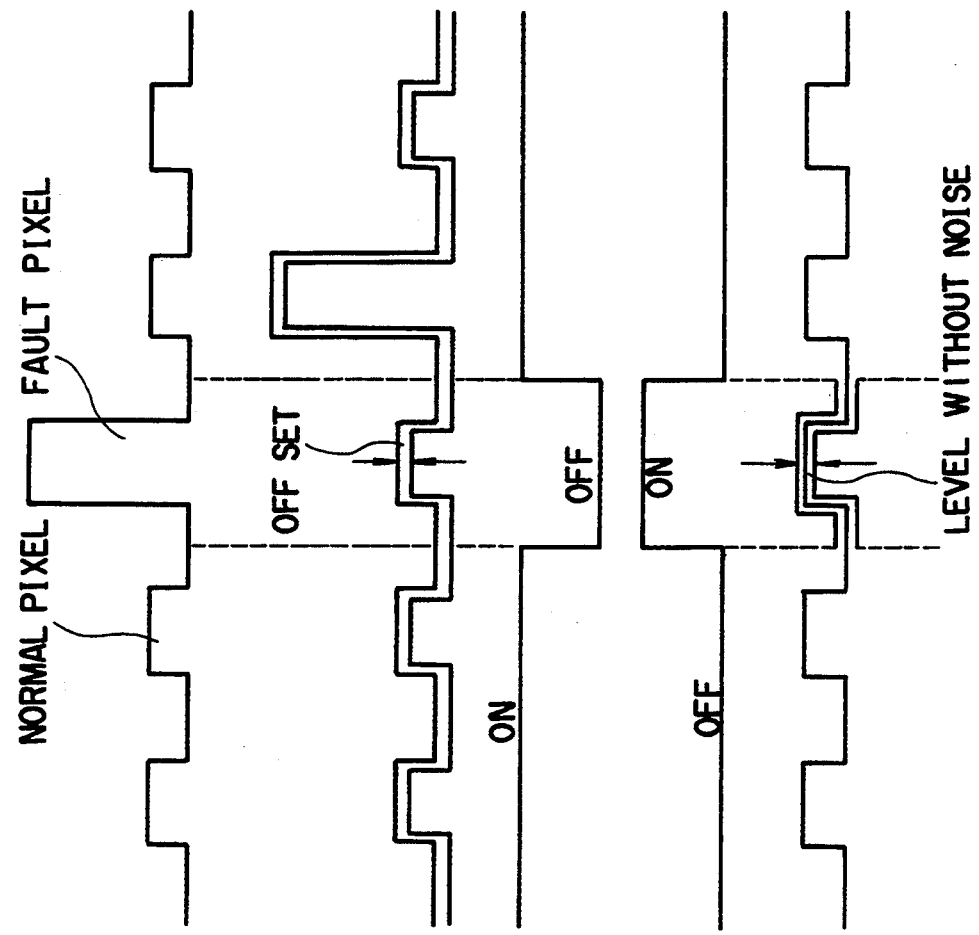
FIGS. 21A to 21E are a timing chart explaining how the circuit of FIG. 20 performs offset correction.

The offset adjusters $V_{OF1}$, VOF2, $V_{OF3}$ and $V_{OF4}$ adjust an image signal shown in FIG. 21A, containing normal pixel signals and a fault pixel signal. When the switches 158 to 161 are controlled by the pulses shown in FIGS. 21C and 21D, the output buffer amplifier 162 outputs a signal the offset of which has been adjusted and which therefore contains no noise. In other words, the fault pixel signal (FIG. 21A) has been readily replaced by a normal pixel signal. The circuit shown in FIG. 20 can also correct a pixel fault resulting from a switch-controlling pulse contained in a normal pixel signal.

A digital image signal processing apparatus according to a fifth embodiment of this invention will now be described, with reference to FIG. 22. FIG. 22 shows a pixel-fault correcting circuit which can add a normal pixel signal to a normal pixel signal which has replaced a fault pixel signal, with high accuracy, maintaining the high frequency of both signals.

In the circuit of FIG. 22, four signals, obtained by dividing an input pixel signal into four parts, are supplied from input terminals I1 to I3 to an output terminal OUT through three switch circuits, respectively. Each of the switch circuits comprises three transistors and three resistors.

More specifically, the input terminal I1 is connected to the base of a transistor $TR_{14}$. The collector of the transistor $TR_{14}$ is connected to the ground, and the emitter thereof is connected to a power supply PS1 by a resistor $R_{1A}$ and also to the base of a transistor $TR_{3A}$. The emitter of the transistor $TR_{1A}$ is connected the base of transistor $TR_{3A}$ by a transistor $TR_{2A}$ which functions as a MOS switch. The transistor $TR_{3A}$ has its base connected to the ground by a resistor $R_{2A}$, its the collector connected to the power supply PS1, and its emitter connected to an output terminal OUT by a resistor $R_4$. The other switch circuits connected to the input terminals I2, I3 and I4, respectively, are similar in structure to the switch circuit connected to the input terminal I1, and will not therefore described in detail.

An adder circuit of the ordinary type adds signals by combining the outputs of switches as is illustrated in FIG. 20. Consequently, the terminal capacitance of each switch increases, degrading the frequency characteristic of the switch, or the control-pulse coupling occurs between the switches, deteriorating the waveform of a signal. Measures are taken to prevent such a problem in the pixel-fault correcting circuit of FIG. 22. That is, the four switch circuits operate independently of one another, and can cooperate to add signals, without increasing noise in a high-frequency region.

To be more specific, in the switch circuit connected to the input terminal I1, the biases of the resistors $R_{1A}$ and $R_{2A}$ are of such values that the transistor $TR_{3A}$ is turned on when the transistor $TR_{2A}$ is turned on. And the biases of the resistor $R_{2A}$ is of such a value that the transistor $TR_{3A}$ is turned off when the transistor $TR_{2A}$ is turned off. The other three switch circuits are similarly designed. Hence, a signal is supplied to the output terminal OUT only when the transistors $TR_{2A}$, $TR_{2B}$, $TR_{2C}$ and $TR_{2D}$ are turned on. Since these transistors are independently turned on or off, their terminal capacitances do not increase, the frequency characteristic of each switch will not be degraded, nor will the waveform of a signal be deteriorated.

In the above embodiments, pixel signals may be converted into digital signals, and the digital signals may be processed. This can easily be accomplished by using digital signal processing circuits in place of the dividing/delay circuit for dividing an input pixel signal into a plurality of pixel signals and the switch circuit for switching the signals output by the dividing/delay circuit. Further, the dividing/delay circuit and the switch circuit may be constituted in the form of a CCD which divides a pixel signal into electric charges and selects some of these electric charges.

A sixth embodiment of this invention will now be described with reference to FIGS. 23 and 24. This embodiment is an image signal processing apparatus which is designed for use in combination of a solid-state imaging device and which has a pixel-fault correcting circuit equipped with no switches.

Figure 23:
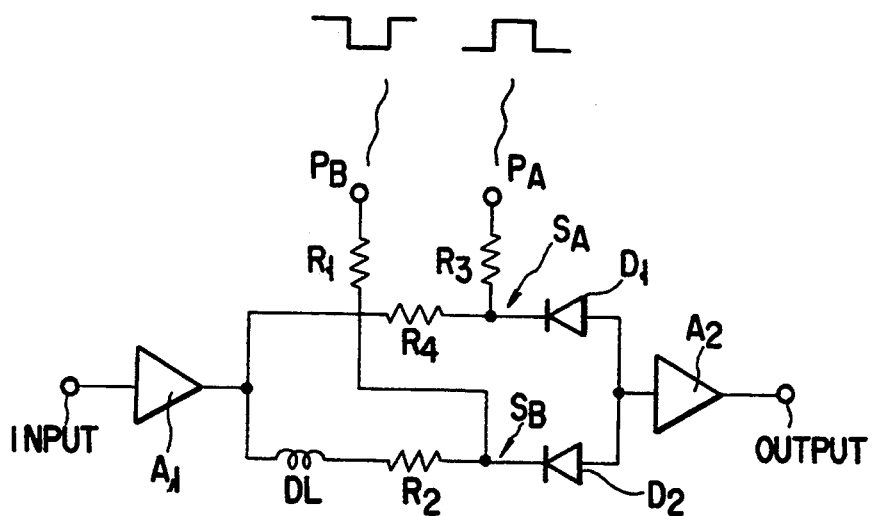
FIG. 23 is a circuit showing the basic structure of the pixel-fault correcting circuit incorporated in an image signal processing apparatus according to a sixth embodiment of the present invention.

FIG. 23 is a diagram showing the basic structure of the pixel-fault correcting circuit. A signal generated by a CCD is supplied to the input terminal. The signal is amplified by an amplifier Amp 1. The amplified signal is divided into a signal $S_A$ not delayed at all and a signal $S_B$ delayed by a delay line DL by one-pixel delay time. Correction pulses $P_A$ and $P_B$ are input to the pixel-fault correcting circuit. The pulse $P_A$ is divided by resistors $R_3$ and $R_4$ combined with the signal $S_A$, forming a synthesized signal. Similarly, the pulse $P_B$ is divided by resistors $R_1$ and $R_2$ and combined with the signal $S_B$, forming a synthesized signal. The two synthesized signals, thus formed, pass through diodes $D_1$ and $D_2$, respectively, and then are combined into a signal, which is supplied to the output terminal via an amplifier Amp 2.

Figure 24:
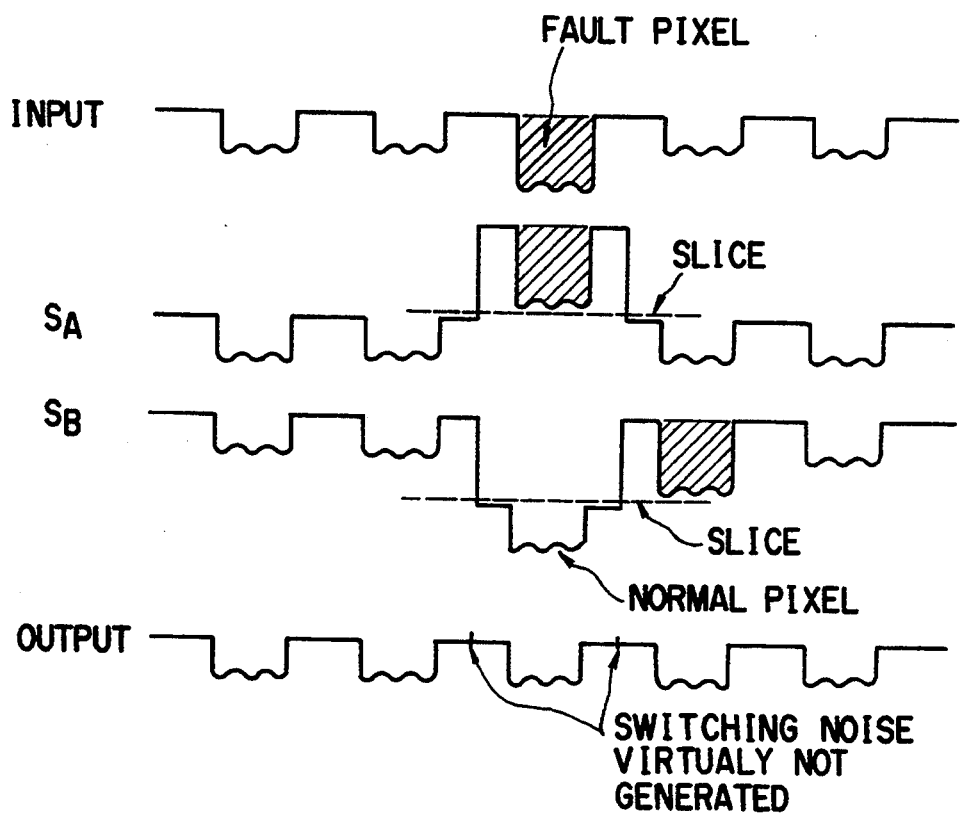
FIG. 24 is a diagram showing the waveforms of the signals used in the circuit of FIG. 23, explaining the operation thereof.

With reference to FIG. 24, a timing chart, it will be explained how the circuit of FIG. 23 operates.

As has been described, the input signal containing, for example, one fault pixel signal, is divided into a non-delayed signal $S_A$ and a delayed signal $S_B$. Only the fault pixel signal contained in the delayed signal $S_B$ is level-shifted in accordance with the correction pulse $P_B$. The signal $S_B$ has been obtained by level-shifting any signal other than the signal output by the normal pixel immediately preceding a fault pixel, in accordance with the correction pulse $P_B$. The input bias (i.e., slice level in FIG. 24) of the amplifier Amp 2 is of such a value that the diodes $D_1$ and $D_2$ are turned on only when the node of the resistors $R_3$ and $R_4$ and the node of the resistors $R_1$ and $R_2$ are level-shifted. Hence, only the fault pixel signal is replaced by the normal pixel signal generated by the normal pixel which immediately precedes the fault pixel.

To replace the fault pixel signal with the normal one, it suffices to shift the level of the image signal by only the amplitude of the fault pixel signal. The noise generated upon switching the diodes and contained in the output signal will give rise to virtually no problems. In addition, the correction pulses have an amplitude of only about 0.5 Vp-p, whereas pulses having an amplitude of about 5 Vp-p need to be used to drive transistor switches for directly switching signal. Further, since the corrections pulses are used, switching signals, during only the ineffective period of the pixel signal, the effective portion of the pixel signal will be less affected than otherwise.

A seventh embodiment of the invention will be described, which an image signal processing apparatus identical to the second embodiment, except that the level shifting scheme of the sixth embodiment is employed. As can be understood from FIG. 25, this image signal processing apparatus is identical to the circuit of FIG. 5, except that a level shifter 90 of the type shown in FIG. 23 is used instead of the switches 65 to 69. In other words, the amplifier Amp 1 (FIG. 23) replaces the amplifiers 60 to 64 (FIG. 5), and the amplifier Amp 2 (FIG. 23) replaces the output amplifier 70 (FIG. 5). The level shifter 90 is controlled by pixel-fault correction pulses output by a pulse shaper 76.

Figure 25:
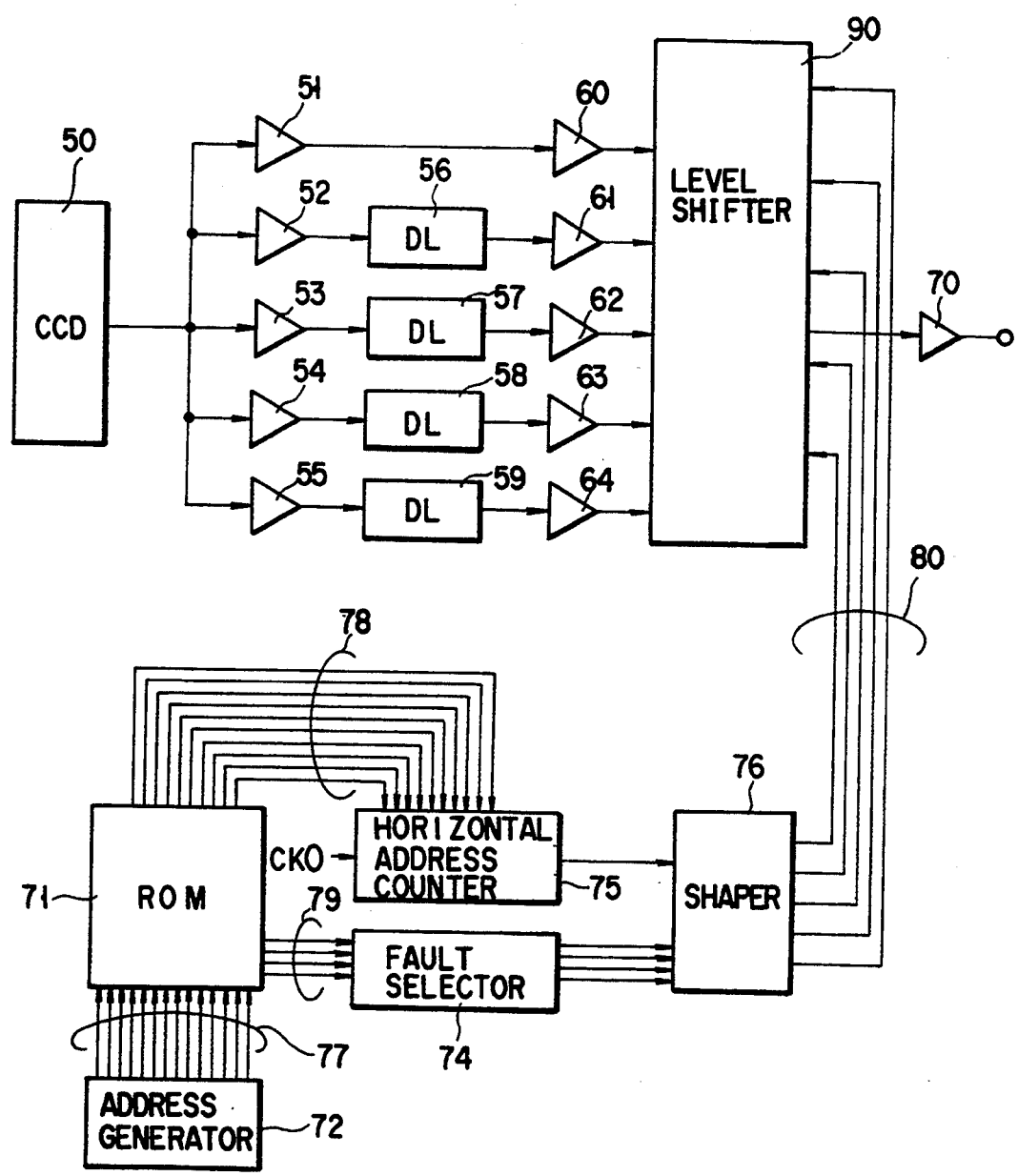
FIG. 25 is a circuit diagram showing an image signal processing apparatus according to a seventh embodiment of this invention.

The circuit of FIG. 25 processes the input image signal in the same way as is illustrated in FIGS. 6A to 6K, and can correct complex pixel faults in the same method as in the second embodiment (FIG. 5). Further, since no switches whatever are used, the problem of switching noise is solved.

An eighth embodiment of the present invention will be described, which is an image signal processing apparatus designed for processing signals output by a high-vision CCD which has two output lines and 2,000,000 pixels (arranged in 1,000 rows and 2,000 columns) and which outputs signals at frequency of 37.125 MHz. This embodiment can process image signals with high efficiency as has been proved by the experiments which the inventors hereof conducted.

The apparatus can correct many pixel faults at high speed and can reduce the noise contained in each pixel signal. It comprises a pixel-fault correcting circuit of the structure shown in FIG. 26. The circuit will be described with reference to FIG. 26, and it will be explained, with reference to FIG. 27, how the circuit correct one to three fault pixel signals output by the pixels of the same row.

As is shown in FIG. 26, the output terminal of a buffer amplifier 100 which receives a signal $OS_A$ is connected to three signal lines by resistors $R_9$, $R_{10}$ and $R_{11}$, respectively. The first signal line includes no delay line and is connected to a filter which comprises a resistor $R_1$ and a capacitor $C_1$. The second signal line includes two series-connected delay lines 120 an 121 and is connected to a filter which comprises a resistor $R_2$ and a capacitor $C_2$. The third signal line includes four series-connected delay lines 122 to 125 and is connected to a filter which comprises a resistor $R_3$ and a capacitor $C_3$. The filters, designed to change the waveforms of the input signals to identical ones, are connected to buffer amplifiers 102, 103 and 104, respectively. The outputs of the amplifiers 102, 103 and 104 are connected to the cathodes of signal-switching diodes 140, 141 and 142, respectively. The anodes of these diodes are connected to a buffer amplifier 108, which in turn is coupled to the cathode of a diode 146 by a resistor $R_{21}$ and a delay line 135.

As is shown in FIG. 26, too, the output terminal of a buffer amplifier 101 which receives a signal $OS_B$ is connected to three signal lines by resistors $R_{12}$, $R_{13}$ and $R_{14}$, respectively. The first of these signal lines includes a delay line 126 and is connected to a filter which comprises a resistor $R_4$ and a capacitor $C_4$. The second of the signal lines includes three series-connected delay lines 127, 128 and 129 and is connected to a filter which comprises a resistor $R_5$ and a capacitor $C_5$. The third of the signal lines includes five series-connected delay lines 130 to 134 and is connected to a filter which comprises a resistor $R_6$ and a capacitor $C_6$. These filters are designed to change the waveforms of the input signals to identical ones, and are connected to buffer amplifiers 105,106 and 107, respectively. The outputs of the amplifiers 105,106 and 107 are connected to the cathodes of signal-switching diodes 143,144 and 145, respectively. The anodes of these diodes are connected to a buffer amplifier 109, which in turn is coupled to the cathode of a diode 147 by a resistor $R_{22}$.

The anodes of the diodes 146 and 147 are connected to a buffer amplifier 110, which in turn is connected to an output terminal OUT by a resistor $R_{24}$. Resistors $R_7$ and $R_8$ are connected to the lines for supplying the signals $OS_A$ and $OS_B$ to the buffer amplifiers 100 and 101, and adjust the impedances of the signals $OS_A$ and $OS_B$. Also, resistors $R_{15}$ to $R_{17}$ are connected to the signal lines connecting the amplifier 100 to the amplifiers 102 to 104, and adjust the impedance of the signal $OS_A$. Similarly, resistors $R_{18}$ to $R_{20}$ are connected to the signal lines connecting the amplifier 101 to the amplifiers 105 to 107, and adjust the impedance of the signal $OS_B$. Further, a resistor $R_{23}$ is coupled to the line connected the diodes 146 and 147 to the buffer amplifier 110, for adjusting the impedance of the signal formed by combining the outputs of the diodes 146 and 147. Still further, resistors $R_{25}$ to $R_{30}$ are connected to the inputs of the buffer amplifiers 102 to 107, respectively, for adjusting the impedances of the signals input to these buffer amplifiers.

The delay lines 120 to 135 have a one-pixel delay time of 13.5 ns. Pulses $P_{A-}$, $P_{A0}$, $P_{A+}$, $P_{B-}$, $P_{B0}$, and $P_{B+}$ are supplied to the buffer amplifiers 102,103, 104, 105,106 and 107, respectively, for shifting the level of the diodes 140 to 147. The resistors $R_{25}$ to $R_{30}$ also serve to reduce the amplitudes of fault-pixel correction pulses. In FIG. 26, $S_{A-}$ is the signal which is not delayed and input to the amplifier 102, and $S_{A0}$, $S_{A+}$, $S_{B-}$, $S_{B0}$ and $S_{B+}$ denote signals which are delayed and input to the amplifiers 103,104,105,106 and 107, respectively.

In FIG. 27, "1" to "25" indicate pixels, the mark X denotes a fault pixel, and A and B represent the signals $OS_A$ and $OS_B$ output by the CCD. Also in FIG. 27, $P_{A-}$, $P_{A0}$, $P_{A+}$, $P_{B-}$, $P_{B0+}$ and $P_{B+}$ denote correction pulses for achieving level, which are associated with the signals $S_{A-}$, $S_{A0}$, $S_{A+}$, $S_{B-}$, $S_{B0}$ and $S_{B+}$. Any pixel number in parentheses indicates the pixel the output signal of which has replaced a fault pixel signal. In the instance of FIG. 27, one pixel fault A, two consecutive pixel faults A and B, and three consecutive pixel faults A, B and A have occurred in a row of pixels.

To correct the single pixel fault A, the corresponding fault pixel signal contained in the signal $S_{A0}$ is level-shifted, and all pixel signals in the signal $S_{A+}$, except the third by which to replace the fault pixel signal, are level-shifted, and only the signal not level-shifted (i.e., the third pixel signal) is synthesized. As a result, the fault pixel signal (i.e., the fifth pixel signal) is replaced by the third pixel signal which is a normal one, as shown in $DLS_{A0}$, FIG. 27.

The consecutive two pixel faults A and B, and the consecutive three pixel faults A, B and A can be corrected by performing similar level shifting in accordance with the correction pulses $P_{A-}$, $P_{A0}$, $P_{A+}$, $P_{B-}$, $P_{B0}$ and $P_{B+}$.

If this operation is repeated m times, each time for one row consisting of n pixels, then at most n (horizontal)$\times$m (vertical) pixel faults can be corrected. The eighth embodiment of the invention can, thus, correct pixel faults made in a high-vision CCD which has a great number of pixels, while reducing the noise contained in each pixel signal.

The level shifter used in the present invention as a main feature thereof will now be described in detail, with reference to FIGS. 28 and 29.

FIG. 28 shows a circuit which combines a correction pulse with a pixel signal, thereby to accomplish level shifting, and FIG. 29 is a diagram showing the waveforms of signals, explaining how the circuit of FIG. 28 performs its function.

As is shown in FIG. 28, an image signals $S_A$ and $S_B$ are supplied to the bases of transistors $Tr_{31}$ and $Tr_{32}$. The collectors of the transistors $Tr_{31}$ and $Tr_{32}$ are connected to a positive power supply $V_D$, and the emitters of these transistors are connected to a negative power supply $v_S$ by resistors $R_{31}$ and $R_{32}$. The emitter of the transistor $Tr_{31}$ is connected to a correction pulse (PA) input terminal by series-connected resistors $R_{32}$ and $R_{33}$, and also to the anode of a diode $D_{31}$. The emitter of the transistor $Tr_{32}$ is connected to a correction pulse (PB) input terminal by series-connected resistors $R_{35}$ and $R_{36}$, and also to the anode of a diode $D_{32}$. The cathodes of the diodes $D_{31}$ and $D_{32}$ are connected to an output terminal Vout.

The fault pixel signal P3 in the input signal $S_A$ is shifted to the left (FIG. 29) by the correction pulse $P_A$. At this time the diode $D_{32}$ is cut off. All pixel signals in the signal $S_B$ delayed by one-pixel delay time, except pixel signal P2 to replace the fault pixel signal P3, are shifted to the left by the correction pulse $P_B$. At this time, the diode $D_{32}$ is cut off. As can be understood from FIG. 29, the signal Vout obtained by combining the output signals of the diodes $D_{31}$ and $D_{32}$ contains three pixel signals P2, P2 and P4, and no longer contains the fault pixel signal P3 which has been replaced by the second pixel signal P2.

Figure 30:
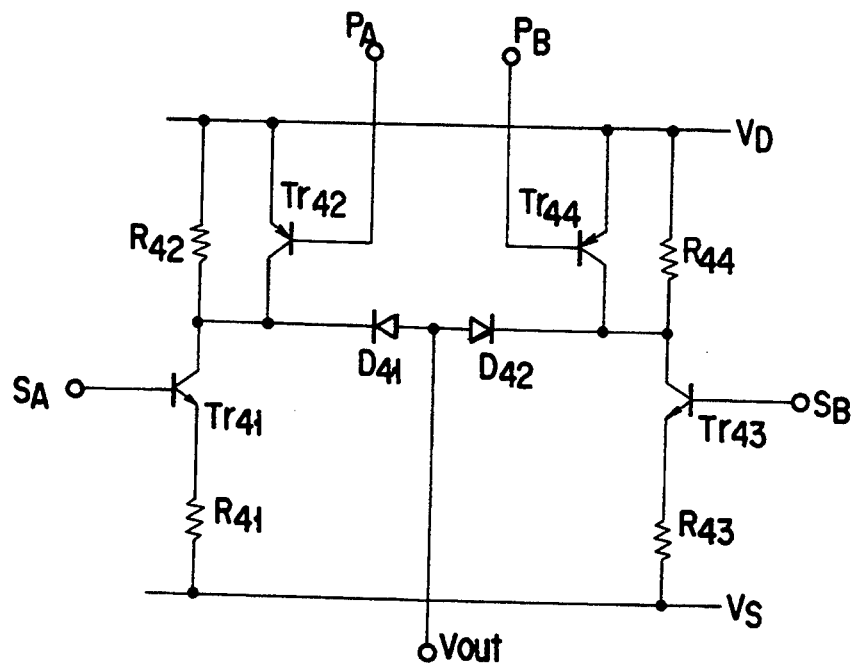
FIG. 30 is a diagram showing a pixel-fault correcting circuit, in which a voltage is controlled, achieving level shifting, thereby to correct pixel fault.

FIG. 30 shows another level shifter which can be used in the pixel-fault correcting circuit according to the present invention. In this level shifter, a voltage is controlled to achieve level shifting.

In the level shifter of FIG. 30, a signal $S_A$ is input to the base of a transistor $Tr_{41}$. The emitter of the transistor $Tr_{41}$ is connected by a resistor $R_{41}$ to a negative power supply $V_S$. The collector of the transistor $Tr_{41}$ is connected to by a resistor $R_{42}$ to a positive power supply $V_D$, to the collector of a transistor $Tr_{42}$, and to the cathode of a diode $D_{41}$. The emitter of the transistor $Tr_{42}$ is coupled to the positive power supply $v_D$. A correction pulse $P_A$ is input to the base of the transistor $Tr_{42}$. A signal $S_B$ is input to the base of a transistor $Tr_{43}$. The emitter of the transistor $Tr_{43}$ is connected by a resistor $R_{43}$ to the negative power supply $V_S$. The collector of the transistor $Tr_{43}$ is connected to by a resistor $R_{44}$ to the positive power supply $V_D$, to the collector of a transistor $Tr_{44}$, and to the cathode of a diode $D_{42}$. The emitter of the transistor $Tr_{44}$ is coupled to the positive power supply $V_D$. A correction pulse $P_B$ is input to the base of the transistor $Tr_{44}$. The anodes of the diodes $D_{41}$ and $D_{42}$ are coupled to an output terminal Vout.

Figure 31:
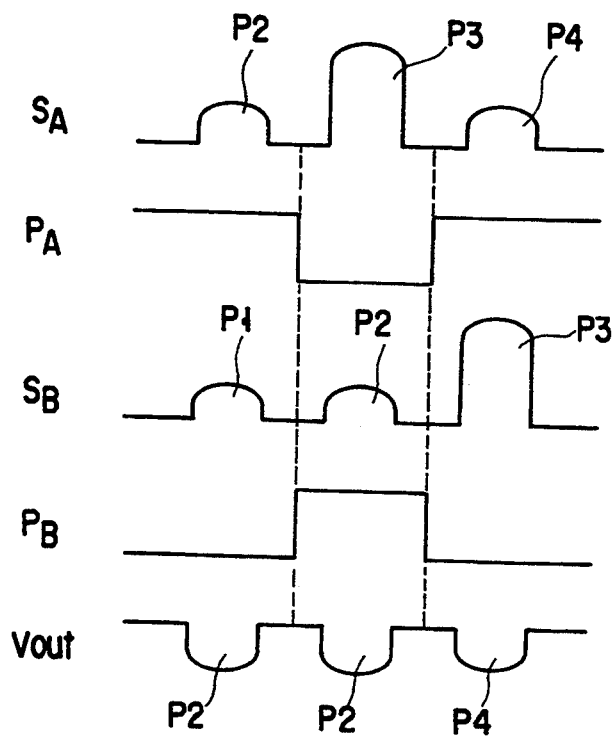
FIG. 31 is a diagram showing the waveforms of signals, explaining how the circuit of FIG. 30 performs its function.

The operation of the level shifter shown in FIG. 30 will be explained, with reference to FIG. 31 which is a timing chart.

The transistor $Tr_{41}$ inverts and amplifies the input signal $S_A$. At this time, the transistor $Tr_{42}$ is turned on by the correction pulse $P_A$, short-circuiting the resistor $R_{42}$. As a result, a fault pixel signal P3 is shifted to the positive power supply $v_D$, whereby the diode $D_{41}$ is cut off. In the meantime, the transistor $Tr_{43}$ inverts and amplifies the signal $S_B$. Then, the transistor $Tr_{43}$ is turned on by the correction pulse $P_B$. As a result, all pixel signals in the signal $S_B$, but the pixel signal P2 to replace the fault pixel signal P3, are shifted to the positive power supply $V_D$. The this time, the diode $D_{42}$ is cut off. The diodes $D_{41}$ and $D_{42}$ combine the signals $S_A$ and $S_B$, forming a signal Vout in which the fault pixel signal P3 has been replaced by the normal pixel signal P2 as can be understood from FIG. 31.

Figure 32:
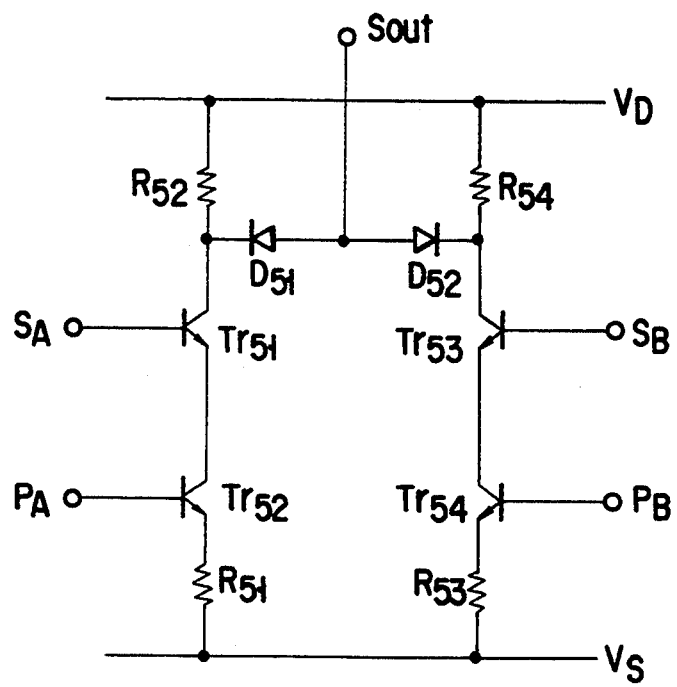
FIG. 32 is a diagram showing a pixel-fault correcting circuit, in which a voltage is controlled, achieving level shifting, thereby to correct pixel fault.

FIG. 32 shows another level shifter which can be used in the pixel-fault correcting circuit according to the invention. This level shifter is characterized in that a voltage is controlled to achieve level shifting.

In the level shifter of FIG. 32, an input signal $S_A$ and a correction pulse $P_A$ are supplied to the bases of series connected transistors $Tr_{51}$ and $Tr_{52}$, respectively. The collector of the transistor $Tr_{51}$ is connected by a resistor $R_{52}$ to a positive power supply $V_D$ and also to the cathode of a diode $D_{51}$. The emitter of the transistor $Tr_{52}$ is connected by a resistor $R_{51}$ to a negative power supply $V_S$. An input signal $S_B$ and a correction pulse $P_B$ are supplied to the bases of series connected transistors $Tr_{53}$ and $Tr_{54}$, respectively. The collector of the transistor $Tr_{53}$ is connected by a resistor $R_{54}$ to a positive power supply $V_D$ and also to the cathode of a diode $D_{52}$. The emitter of the transistor $Tr_{54}$ is connected by a resistor $R_{53}$ to a negative power supply $V_S$. The anodes of the diodes $D_{51}$ and $D_{52}$ are connected to an output terminal Sout.

Figure 33:
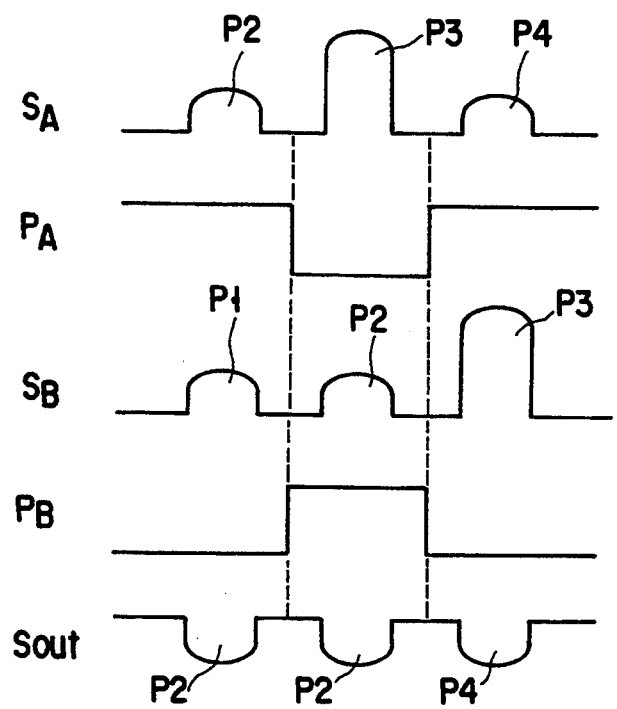
FIG. 33 is a diagram showing the waveforms of signals, explaining how the circuit of FIG. 32 performs its function.

The operation of the level shifter shown in FIG. 32 will be explained with reference to FIG. 33 which is a timing chart.

The transistor $Tr_{51}$ inverts and amplifies the input signal $S_A$. When the correction pulse $P_A$ is input to the transistor $Tr_{50}$, the resistor $R_{51}$ controls the current in the transistor $Tr_{51}$. As a result of this, the collector level of the transistor $Tr_{51}$ is shifted to the positive power supply $V_D$. The level thus shifted is set at the cutoff level of the diode $D_{51}$. Hence, the fault pixel signal contained in the signal $S_A$ is not supplied to the output terminal Sout.

The transistor $TR_{53}$ inverts and amplifies the input signal $S_B$. When the correction pulse $P_B$ is input to the transistor $Tr_{54}$, turning on this transistor, the resistor $R_{53}$ controls the current flowing through the transistor $Tr_{53}$. Hence, all pixel signals in the signal $S_B$, except the pixel signal P2 to replace the fault pixel signal P3, are level-shifted. At this time, the diode $D_{52}$ is cut off. As a result, the diodes $D_{51}$ and $D_{45}$ combine the signals $S_A$ and $S_B$, forming a signal Sout in which the fault pixel signal P3 has been replaced by the normal pixel signal P2 as can be understood from FIG. 33. This signal is supplied to the output terminal Sout.

Three types of level shifters have been described, which can be utilized in the image signal processing apparatus according to the present invention. Each of these level shifters has no switches at all, and is therefore free from the problem of switching noise.

The level shifter for use in the invention is not limited to those shown in FIGS. 28, 30 and 32. Various modifications can be used in the invention, provided that they level-shift two or more signals, thereby to replace a fault pixel signal with a normal one. For example, an image signal consisting of pixel signals which, except a fault one, are level-shifted, may be combined with an image signal consisting of pixel signals of which only the normal pixel to replace the fault pixel signal is level-shifted, thereby forming an output signal. Alternatively, an image signal consisting of pixel signals of which only the fault signal is level-shifted may be combined with an image signal consisting of pixel signals of which only the normal pixel signal to replace the fault pixel signal is level-shifted, thereby forming an output signal. Still alternatively, an image signal consisting of pixel signals which, except a fault one, are level-shifted, may be combined with an image signal consisting of pixel signals which, except only the normal one to replace the fault pixel signal, are level-shifted, thereby forming an output signal.

As has been described in detail, the image signal processing apparatus according to the present invention comprises a fault-pixel correcting circuit which comprises means for dividing a pixel signal output by a solid-state imaging device into a plurality of pixel signals and delaying at least some of the pixel signals at different periods, and means for selectively combining the non-delayed pixel signal and the delayed signals. The apparatus can therefore correct a fault pixel signal, if included in the image signal output from the solid-state imaging device, at high speed without increasing noise. Also, the apparatus can correct many pixel faults occurring at one position. More specifically, the image signal processing apparatus is advantageous in the following respects:

(1) At most n (horizontal)×m (vertical) pixel faults can be corrected.
(2) The correction pulse noise is reduced.
(3) It is applicable to a high-speed imaging device
(4) The synchronous noise from the correction pulse generator is small.
(5) The correction error, if any, is small since a fault pixel signal is replaced by the pixel signal output by the normal pixel preceding or following the fault pixel.

All embodiments described herein are image signal processing apparatuses designed for use in combination with a solid-state imaging device. Nonetheless, the present invention can be applied to an apparatus for processing digital image signals output by any other device, or to an apparatus for processing image signals to be supplied to a crystal-liquid display.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image signal processing apparatus having a function for correcting a signal corresponding to some fault pixels contained in a plurality of pixels which are located in rows and columns to construct an imaging device, said apparatus comprising:

memory means for storing a data code representing a position and a pattern of a fault pixel region, wherein the fault pixel region includes a plurality of fault pixels contained in said imaging device and located continuously in at least one of said rows and columns;

conversion means for converting the data code read from said memory means, into a pixel-fault correction pulse; and pixel-fault correcting means for replacing fault pixel signals output by said continuously located fault pixels with a normal pixel signal output by at least one normal pixel located near said continuously located fault pixels, in response to the pixel-fault correction pulse.

2. The apparatus according to claim 1, wherein said imaging device is a solid-state imaging device which comprises a plurality of photoelectric pixels for outputting pixel signals and which outputs an image signal during a horizontal scanning period including a blanking period and an effective period for each pixel, and said pixel-fault correcting means includes switch circuit means which is connected to an output of said solid-state imaging device and which is driven by said pixel-fault correction pulse during said blanking period for each pixel, thereby to replace the fault pixel signals output by the fault pixels with the pixel signal output by the normal pixel.

3. The apparatus according to claim 2, wherein said conversion means comprises means for converting the data code into a pixel-fault correction pulse during the blanking period within one horizontal period and for supplying the pixel-fault correction pulse to said switch circuit means to replace the fault pixel signals with the normal pixel.

4. An image signal processing apparatus having a function for correcting a fault signal corresponding to some fault pixels included in a plurality of pixels located in rows and columns and constructing an imaging device, said apparatus comprising:

memory means for storing a data code representing a position and a pattern of a fault pixel region, wherein the fault pixel region includes a plurality of fault pixels contained in said imaging device and located continuously in at least one of said rows and columns;

conversion means for converting the data code read from said memory means, into a pixel-fault correction pulse;

a dividing/delay circuit for dividing a pixel signal train supplied from the imaging device, into a plurality of divided pixel signal trains delayed by different periods; and switch means for selecting pixel signals from the divided pixel signal trains delayed by different periods, in accordance with the pixel-fault correction pulse, to replace the fault pixel signals with a normal pixel signal corresponding to at least one normal pixel near the fault pixel.

5. The apparatus according to claim 4, wherein said imaging device is a solid-state imaging device which comprises a plurality of photoelectric pixels for outputting pixel signals and which outputs a pixel signal train during a horizontal scanning period including a blanking period and an effective period for each pixel, said dividing/delay circuit has a plurality of delay lines for delaying said plurality of pixel signal trains by different periods, and said switch means selects a non-delayed pixel signal train and the delayed pixel signal trains during the blanking period for each pixel.

6. The apparatus according to claim 4, wherein said memory means stores a data code representing the position and the pattern during each horizontal scanning period, said conversion means comprises a decoder for reading the data code from said memory means during the blanking period in each horizontal period and converts the data code into a pixel-fault correction pulse.

7. The apparatus according to claim 4, wherein said conversion means comprises a horizontal address counter for outputting a pulse representing the position of one of the fault pixels located continuously to a horizontal direction, a fault pixel selecting circuit for outputting, during the effective period, a pulse representing the pattern of said continuously located fault pixels, and a pulse shaping circuit for combining the pulses output by said horizontal address counter and said fault pixel selecting circuit, thereby to form a fault-pixel correction pulse.

8. The apparatus according to claim 4, wherein said dividing/delay circuit has offset control means for controlling DC offsets of said plurality of pixel signal trains, independently of one another.

9. The apparatus according to claim 4, wherein said switch means comprises a plurality of switch circuits for receiving said pixel signal trains from said dividing/delay circuit and for performing independent switching operations on the pixel signal trains, thereby to prevent interference among the pixel signal trains.

10. The apparatus according to claim 4, wherein said switch means comprises a plurality of switches for receiving said pixel signal trains from said dividing/delay circuit, a plurality of transistors having bases connected to outputs of said switches, respectively, and having emitters connected to one another, and bias setting means for setting such a bias that each of said transistors remains on while the switch associated with the transistor is on.

11. The apparatus according to claim 4, wherein said imaging device is a solid-state imaging device for processing a digital image signal, said delay-dividing circuit divides the digital image signal into a plurality of pixel signals, and said switch means switches the pixel signals.

12. An image signal processing apparatus having a function for correcting a fault signal output by an imaging device having a plurality of pixels arranged in rows and columns, said apparatus comprising:

memory means for storing data representing the position of a fault pixel region includng a plurality of fault pixels located continuously and contained in said pixels of said imaging device, said fault pixels producing a plurality of fault pixel signals;

conversion means for converting the data read from said memory means, into a pixel-fault position designating pulse;

a dividing/delay circuit for dividing an input pixel signal output by said imaging device, into a plurality of divided pixel signals;

level-shifting means for level-shifting the fault pixel signals or any other signal other than the fault pixel signals in accordance with the pixel-fault position designating pulse, thereby to extract a first signal, and level-shifing a normal pixel signal for correcting the fault pixel signals or level shifting any signal other than this normal pixel signal, to extract a second signal; and signal-synthesizing means for synthesizing the first signal and the second signal into a signal.

13. The apparatus according to claim 12, wherein said dividing/delay circuit divides the pixel signal into a non-delayed pixel signal and a plurality of delayed pixel signals delayed by different delay times, each being an integral multiple of one-pixel time, said level-shifting means selectively level-shifting the non-delayed pixel signal and the delayed pixel signals by opposite phase position designation pulses, and said signal-synthesizing means comprises a diode circuit for synthesizing the level-shifted pixel signals into a signal.

14. The apparatus according to claim 13, wherein said level-shifting means level-shifts only a non-delayed fault pixel signal in a negative direction, and level-shifts pixel signals other than the pixel signals delayed for correcting the fault pixel signals in the negative direction.

15. The apparatus according to claim 12, wherein said level-shifting means comprises a resistance-controlled level-shifting circuit for level-shifting pixel signals by a resistance control.

16. The apparatus according to claim 12, wherein said level-shifting means comprises a voltage-controlled level-shifting circuit for level-shifting pixel signals by a voltage control.

17. The apparatus according to claim 12, wherein said level-shifting means comprises a current-controlled level-shifting circuit for level-shifting pixel signals by a current control.

18. An image signal processing apparatus having a function for correcting a signal output by a solid-state imaging device having a plurality of pixels located in rows and columns and two output lines, said apparatus comprising:

memory means for storing data representing a position of a fault pixel region including a plurality of continuous fault pixels which are included in said pixels of said imaging device;

conversion means for converting the data read from said memory means, into a pixel-fault position designating pulse;

a dividing/delay circuit for dividing each of two first image signals output from the output lines of said imaging device into a plurality of second image signals delayed by different delay amounts;

first level-shifting means for level-shifting a plurality of continuous fault pixel signals included in the second image signals in accordance with the pixel-fault position designating pulse;

second level-shifting means for level-shifting pixels signals of the second image signals which are other than a normal pixel signal for correcting the continuous fault pixel signals included in the second image signals; and a synthesizing circuit for synthesizing level-shifted signals during a period other than the period during which said first and second level-shifting means level-shift the signals.

19. An image signal processing apparatus having a function for correcting a signal corresponding to some fault pixels contained in a plurality of pixels which are arranged in rows and columns to construct an imaging device, said apparatus comprising:

memory means for storing a data code representing a position and a pattern of a fault pixel region, wherein the fault pixel region includes a plurality of fault pixels contained in said imaging device and arranged continuously in at least one of said rows and columns;

conversion means for converting the data code read from said memory means, into a pixel-fault correction pulse; and pixel-fault correcting means for replacing fault pixel signals output by the fault pixels with normal pixel signals output by some normal pixels arranged near the continuous fault pixels, in response to the pixel-fault correction pulse.

20. The apparatus according to claim 19, wherein said imaging device is a solid-state imaging device which comprises:

a plurality of photoelectric pixels for outputting pixel signals and which outputs a pixel signal train during a horizontal scanning period including a blanking period and an effective period for each pixel, wherein said pixel-fault correcting means comprises:

conversion means for converting the data code read from said memory means into a pixel-fault correction pulse;

a dividing/delay circuit for dividing a pixel signal train supplied from the imaging device into a plurality of divided pixel signal trains delayed by different periods; and switch means for selecting pixel signals from the divided pixel signal trains delayed by different periods, in accordance with the pixel-fault correction pulse, thereby to replace the fault pixel signals with a normal pixel signal corresponding to at least one normal pixel near the fault pixel.

21. The apparatus according to claim 20, wherein said dividing/delay circuit has a plurality of delay lines for delaying said plurality of pixel signal trains by different periods, and said switch means selects a non-delayed pixel signal train and the delayed pixel signal trains during the blanking period for each pixel.

22. The apparatus according to claim 20, wherein said memory means stores a data code representing the position and the pattern during each horizontal scanning period, and said conversion means comprises a decoder for reading the data code from said memory means during the blanking period in each horizontal period and converts the data code into a pixel-fault correction pulse.

23. The apparatus according to claim 20, wherein said conversion means comprises:

a horizontal address counter for outputting a pulse representing the position of one of the fault pixels located continuously to a horizontal direction;

a fault pixel selecting circuit for outputting, during the effective period, a pulse representing the pattern of said continuously located fault pixels; and a pulse shaping circuit for combining the pulses output by said horizontal address counter and said fault pixel selecting circuit, thereby to form a fault-pixel correction pulse.

24. The apparatus according to claim 20, wherein said dividing/delay circuit has offset control means for controlling DC offsets of said plurality of pixel signal trains independently of one another.

25. The apparatus according to claim 20, wherein said switch means comprises a plurality of switch circuits for receiving said pixel signal trains from said dividing-/delay circuit and for performing independent switching operations on the pixel signal trains, thereby to prevent interference among the pixel signal trains.

26. The apparatus according to claim 20, wherein said switch means comprises a plurality of switches for receiving said pixel signal trains from said dividing/delay circuit, a plurality of transistors having bases connected to outputs of said switches, respectively, and having emitters connected to one another, and bias setting means for setting such a bias that each of said transistors remain on while the switch associated with the transistor is on.

27. The apparatus according to claim 20, wherein said imaging device is a solid-state imaging device for processing a digital image signal, and said delay-dividing circuit divides the digital image signal into a plurality of pixel signals, and said switch means switches the pixel signals.

* * * * *